US012565617B2

(12) United States Patent
Liu et al.

(10) Patent No.: US 12,565,617 B2
(45) Date of Patent: Mar. 3, 2026

(54) POLYMERISABLE OLIGOMERIC LIQUID CRYSTAL, POLYMERISABLE MEDIUM AND POLYMERISED LIQUID CRYSTAL FILM

(71) Applicant: Merck Patent GmbH, Darmstadt (DE)

(72) Inventors: Danqing Liu, Eindhoven (NL); Yuanyuan Zhan, Eindhoven (NL); Efstathios Barmpoutsis, Eindhoven (NL); Dirk Jan Broer, Eindhoven (NL)

(73) Assignee: Merck Patent GmbH (DE)

( * ) Notice: Subject to any disclaimer, the term of this patent is extended or adjusted under 35 U.S.C. 154(b) by 0 days.

(21) Appl. No.: 18/532,334

(22) Filed: Dec. 7, 2023

(65) Prior Publication Data

US 2024/0209264 A1 Jun. 27, 2024

(30) Foreign Application Priority Data

Dec. 8, 2022 (EP) .................................... 22212134

(51) Int. Cl.

| | |
|---|---|
| ***G02F 1/1333*** | (2006.01) |
| ***C09K 19/38*** | (2006.01) |
| ***C09K 19/60*** | (2006.01) |
| *C09K 19/04* | (2006.01) |

(52) U.S. Cl.

CPC ........ *C09K 19/3857* (2013.01); *C09K 19/601* (2013.01); *C09K 2019/0448* (2013.01)

(58) Field of Classification Search

CPC ...... C09K 19/02; C09K 19/04; C09K 19/601; C09K 19/3852; C09K 19/3857; C09K 2019/0444; C09K 2019/0448; G02F 1/1333; G02F 1/1334

See application file for complete search history.

(56) References Cited

U.S. PATENT DOCUMENTS

| | | | | |
|---|---|---|---|---|
| 7,060,200 | B1 | 6/2006 | Farrand et al. | |
| 2006/0172090 | A1 | 8/2006 | Syundo | |
| 2020/0199453 | A1* | 6/2020 | Beltran Gracia ...... | C09K 19/04 |
| 2022/0213385 | A1 | 7/2022 | Hoshino et al. | |
| 2024/0209264 | A1* | 6/2024 | Liu .................... | C09K 19/3857 |

OTHER PUBLICATIONS

Zaquen et al., "Facile design of degradable poly(B-thioester)s with tunable structure and functionality", Nov. 6, 2013, Journal of Polymer Science Part A: Polymer Chemistryvol. 52, Issue 2 pp. 178-187. (Year: 2013).*

E. Peeters, J. Lub, J.A.M. Steenbakkers, D.J. Broer, Advanced Materials 2006, 18, 2412.

Jampani et al., "Micrometer-Scale Porous Buckling Shell Actuators Based on Liquid Crystal Networks", Advanced Functional Materials, Jun. 5, 2018, vol. 28, No. 31, p. 1801209 (1-9).

Yue et al., "The Effect of the Degree of Polymerization and Polymer Composition on the Temperature Responsiveness of Cholesteric Semi-Interpenetrating Networks", Crystals, Nov. 11, 2022, vol. 12, No. 11, pp. 1614 (1-9).

The extended European Search Report issued Apr. 30, 2024, by the European Patent Office in corresponding European Patent Application No. 23214294.3-1014. (6 pages).

* cited by examiner

*Primary Examiner* — Geraldina Visconti
(74) *Attorney, Agent, or Firm* — Buchanan Ingersoll & Rooney PC

(57) ABSTRACT

A polymerisable oligomeric liquid crystal (LC) and a polymerisable LC medium comprising the polymerisable oligomeric LC together with one or more mono-, di- or multireactive mesogenic compounds. Furthermore, a method for the preparation of the oligomeric LC, a birefringent polymer film obtainable from the polymerisable LC medium, and a method of preparation of such a polymer film. Also, the use of the polymer film as optical component, in particular as ultra-thin polariser (UTP) in a liquid crystal display (LCD), for contrast enhancement in an organic light emitting device (OLED), or for AR/AV/VR applications.

20 Claims, No Drawings

POLYMERISABLE OLIGOMERIC LIQUID CRYSTAL, POLYMERISABLE MEDIUM AND POLYMERISED LIQUID CRYSTAL FILM

CROSS-REFERENCE TO RELATED APPLICATIONS

This application is a U.S. national application filed under 35 U.S.C. §§ 111 and claiming priority under 35 U.S.C. § 119 of and to European Patent Application No. 22212134.5, filed Dec. 8, 2021, which application is incorporated herein by reference in its entirety and for all purposes.

TECHNICAL FIELD OF THE INVENTION

The invention relates to a polymerisable oligomeric liquid crystal (LC) and a polymerisable LC medium comprising the polymerisable oligomeric LC together with one or more mono-, di- or multireactive mesogenic compounds. Furthermore, the present invention relates also to a method for the preparation of the oligomeric LC, a birefringent polymer film obtainable from the polymerisable LC medium, and to a method of preparation of such a polymer film. The present invention further relates to the use of the polymer film as optical component, in particular as ultra-thin polariser (UTP) in a liquid crystal display (LCD), for contrast enhancement in an organic light emitting device (OLED), or for AR/AV/VR applications.

BACKGROUND AND PRIOR ART

OLED displays are constructed with a metallic cathode which has high reflectivity and acts like a mirror. It is important that the viewer only sees the light emitted by the OLED and not incident light reflected off the display. To achieve this an anti-reflection layer is required in the display.

In prior art polarisers are known which are prepared from reactive mesogen (RM) materials. Thus, for example E. Peeters, J. Lub, J. A. M. Steenbakkers, D. J. Broer, *Advanced Materials* 2006, 18, 2412, discloses a high-contrast polariser based on smectic RM materials. The polariser is made by adding a dichroic dye to a smectic-B RM mixture which has been polymerised between two glass plates provided with rubbed polyimide providing the necessary planar orientation. In principle the polarisers can be very thin, and especially much thinner than the presently used stretched polymer/iodine polarisers, when applied on a single substrate. One of the interesting applications is in the field of OLED displays where circular polariser improve the display on contrast in brightly illuminated area.

However, despite their good performance, RM based polarisers are still not widely introduced because of several drawbacks taken. For example, the need of two glass surfaces to maintain the needed planar orientation of the coated RM material is considered as a major obstacle for their introduction and mass production. Therefore, the polarisers are typically produced by a roll-to-roll coating and curing process using a single flexible non-birefringent substrate (e.g. cellulose triacetate or TAC) provided with an alignment layer (such as rubbed polyimide or photoalignment material). This means that as soon as the RM coating is applied, often from its nematic state, it takes a planar orientation. But already very rapidly during transport, when the coating is cooled to its desired smectic state, realignment is taking place under the action of surface tension. It is part of a more general problem that for smectic materials which show a strong tendency to align their smectic layers parallel to the substrate and the realignment from a planar to a homeotropic configuration at the air or nitrogen interface cannot be suppressed.

Therefore, there is still a need for novel and improved RM materials and resulting polymer films which can be used as polarisers and do not exhibit the drawbacks of prior art materials or if they do so, only exhibit them to a lesser extent.

It was therefore an aim of the present invention to provide novel and improved RM materials, methods for their production, polymer films prepared from these RM materials and methods for the production of such films, which do not have the drawbacks of prior art materials, films and methods as mentioned above.

In particular, the RM materials which are used for film preparation should show good and easily achievable alignment already when provided on a single substrate, and should enable the time- and cost-effective preparation of optical films like polarisers with reduced thickness, such as UTPs with excellent optical properties.

Other aims of the present invention are immediately evident to the person skilled in the art from the following detailed description.

Surprisingly, the inventors of the present invention have found that one or more, preferably all of the above requirements can be fulfilled, preferably at the same time, by using RM materials, polymer films and methods as disclosed and claimed hereinafter, especially by using a polymerisable LC medium, hereinafter also referred to as "RM mixture", which additionally contains an oligomeric liquid crystalline or mesogenic compound, hereinafter also simply referred to as "oligomer".

SUMMARY OF THE INVENTION

The invention relates to a polymerisable LC medium comprising one or more mono-, di- or multireactive mesogenic compounds and one or more polymerisable oligomeric liquid crystal or mesogenic compounds.

The polymerisable oligomeric liquid crystal or mesogenic compounds are preferably selected from formula O $$P^1\text{-}Sp^1\text{-}[MG^1\text{-}X^1\text{-}E\text{-}X^2]_n\text{-}MG^1\text{-}Sp^2\text{-}P^2 \qquad \text{O}$$

wherein $P^1$ and $P^2$ independently of each other denote a polymerisable group, $Sp^1$ and $Sp^2$ independently of each other are a spacer group or a single bond, $X^1$ and $X^2$ independently of each denote —S—, —O— or $NR^x$—

E is alkylene having 1 to 20, preferably 2 to 12 C atoms, which is optionally mono- or polysubstituted by F, Cl, Br, I or CN and in which, in addition, one or more non-adjacent $CH_2$ groups may each be replaced, independently of one another, by —O—, —S—, —NH—, —$NR^x$—$SiR^xR^y$—, —CO—, —COO—, —OCO—, —OCO—O—, —S—CO—, —CO—S—, —$NR^x$—CO—O—, —O—CO—$NR^x$—, —$NR^x$—CO—$NR^y$—, —CH=CH— or —C≡C— in such a way that O and/or S and/or N atoms are not linked directly to one another, $MG^1$ is a rod-shaped mesogenic group, which is preferably selected of formula M $$\text{-}(A^1\text{-}Z^1)_a\text{-}A^2\text{-} \qquad \text{M}$$

wherein $A^1$ and $A^2$ denote, in case of multiple occurrence independently of one another, an aromatic or alicyclic group, which optionally contains one or more heteroatoms selected from N, O and S, and is optionally mono- or polysubstituted by L, L is P-Sp-, F, Cl, Br, I, —CN, —$NO_2$, —NCO, —NCS, —OCN, —SCN, —C(═O)$NR^xR^y$, —C(═O)$OR^x$, —C(═O)$R^x$, —$NR^xR^y$, —OH, —$SF_5$, optionally substituted silyl, aryl or heteroaryl with 1 to 12, preferably 1 to 6 C atoms, and straight chain or branched alkyl, alkoxy, alkylcarbonyl, alkoxycarbonyl, alkylcarbonyloxy or alkoxycarbonyloxy with 1 to 12, preferably 1 to 6 C atoms, wherein one or more H atoms are optionally replaced by F or Cl, $R^x$ and $R^y$ independently of each other denote H or alkyl with 1 to 12 C-atoms, $Z^1$ denotes, in case of multiple occurrence independently of one another, —O—, —S—, —CO—, —COO—, —OCO—, —S—CO—, —CO—S—, —O—COO—, —CO—$NR^x$—, —$NR^x$—CO—, —$NR^x$—CO—$NR^y$, —$NR^x$—CO—O—, —O—CO—$NR^x$—, —$OCH_2$—, —$CH_2O$—, —$SCH_2$—, —$CH_2S$—, —$CF_2O$—, —$OCF_2$—, —$CF_2S$—, —$SCF_2$—, —$CH_2CH_2$—, —$(CH_2)_{n1}$, —$CF_2CH_2$—, —$CH_2CF_2$—, —$CF_2CF_2$—, —CH═N—, —N═CH—, —N═N—, —CH═$CR^x$—, —$CY^1$═$CY^2$—, —C≡C—, —CH═CH—COO—, —OCO—CH═CH— or a single bond, preferably —COO—, —OCO— or a single bond, $Y^1$ and $Y^2$ independently of each other denote H, F, Cl or CN, a is 1, 2, 3 or 4, preferably 1 or 2, most preferably 2, n1 is an integer from 1 to 10, preferably 1, 2, 3 or 4, n is the average number of repeat units per molecule and is from 1 to 10, very preferably from 1 to 6.

The invention further relates to novel oligomeric liquid crystal or mesogenic compounds of formula O.

The invention further relates to a method of production for a polymerisable LC medium as described above and below.

The invention further relates to the use of a polymerisable LC medium as described above and below in optical, electronic and electrooptical components and devices, preferably for the preparation of a birefringent polymer film, preferably a birefringent dichroic polymer film, preferably having reduced thickness.

The invention further relates to a birefringent polymer film, preferably a birefringent dichroic polymer film, being obtainable or obtained by polymerising a polymerisable LC medium as described above and below, preferably in its LC phase in an oriented state in form of a thin film.

The invention further relates to a method of production of a birefringent polymer film as described above and below.

The invention especially further to the use of a birefringent polymer film as described above and below, in or as an optical component in an optical, electronic or device, especially as polariser, preferably as ultra-thin polariser (UTP).

The invention further relates to an optical component or an optical, electronic or electrooptical component or device as such, comprising a polymerisable LC medium or a birefringent polymer film as described above and below.

Said devices include, without limitation, electrooptical displays, such as OLED and LCDs, non-linear optic (NLO) devices, optical information storage devices, electronic devices, electroluminescent displays, organic photovoltaic (OPV) devices, lighting devices, sensor devices, electro photographic recording devices, organic memory devices or devices for AR/AV/VR applications.

Terms and Definitions

As used herein, the term "polymer" will be understood to mean a molecule that encompasses a backbone of one or more distinct types of repeating units (the smallest constitutional unit of the molecule) and is inclusive of the commonly known terms "oligomer", "copolymer", "homopolymer" and the like. Further, it will be understood that the term polymer is inclusive of, in addition to the polymer itself, residues from initiators, catalysts, and other elements attendant to the synthesis of such a polymer, where such residues are understood as not being covalently incorporated thereto. Further, such residues and other elements, while normally removed during post polymerisation purification processes, are typically mixed or co-mingled with the polymer such that they generally remain with the polymer when it is transferred between vessels or between solvents or dispersion media.

The term "(meth)acrylic polymer" as used in the present invention includes a polymer obtained from acrylic monomers, a polymer obtainable from methacrylic monomers, and a corresponding co-polymer obtainable from mixtures of such monomers.

The term "polymerisation" means the chemical process to form a polymer by bonding together multiple polymerisable groups or polymer precursors (polymerisable compounds) containing such polymerisable groups.

The terms "film" and "layer" include rigid or flexible, self-supporting or freestanding films with mechanical stability, as well as coatings or layers on a supporting substrate or between two substrates.

The term "liquid crystal or mesogenic compound" means a compound comprising one or more calamitic (rod- or board/lath-shaped) or discotic (disk-shaped) mesogenic groups. The term "mesogenic group" means a group with the ability to induce liquid crystal (LC) phase behaviour. The compounds comprising mesogenic groups do not necessarily have to exhibit an LC phase themselves. It is also possible that they show LC phase behaviour only in mixtures with other compounds, or when the mesogenic compounds or materials, or the mixtures thereof, are polymerised. For the sake of simplicity, the term "liquid crystal" is used hereinafter for both mesogenic and LC materials. For an overview of definitions see C. Tschierske, G. Pelzl and S. Diele, Angew. Chem. 2004, 116, 6340-6368.

A calamitic mesogenic group is usually comprising a mesogenic core consisting of one or more aromatic or non-aromatic cyclic groups connected to each other directly or via linkage groups, optionally comprising terminal groups attached to the ends of the mesogenic core, and optionally comprising one or more lateral groups attached to the long side of the mesogenic core, wherein these terminal and lateral groups are usually selected e.g. from carbyl or hydrocarbyl groups, polar groups like halogen, nitro, hydroxy, etc., or polymerisable groups.

The term "reactive mesogen" (RM) means a polymerisable mesogenic or liquid crystal compound.

Polymerisable compounds with one polymerisable group are also referred to as "monoreactive" compounds, compounds with two polymerisable groups as "direactive" compounds, and compounds with more than two polymerisable groups as "multireactive" compounds. Compounds without a polymerisable group are also referred to as "non-reactive" compounds.

The term "non-mesogenic compound or material" means a compound or material that does not contain a mesogenic group as defined above.

Visible light is electromagnetic radiation that has wavelength in a range from about 400 nm to about 740 nm. Ultraviolet (UV) light is electromagnetic radiation with a wavelength in a range from about 200 nm to about 450 nm.

Unless explicitly noted otherwise, all temperature values indicated in the present application, such as, for example, for the melting point T(Cr, N), the transition from the smectic (S, Sm) to the nematic (N) phase T(S/Sm,N) and the clearing point T(N,I), are quoted in degrees Celsius (° C.). M.p. denotes the melting point, cl.p. denotes the clearing point. Furthermore, Cr denotes the crystalline state, N denotes the nematic phase, S or SmX denotes a smectic X phase and I denotes the isotropic phase. The data between these symbols represent the transition temperatures.

The term "clearing point" means the temperature at which the transition between the mesophase with the highest temperature range and the isotropic phase occurs.

The dichroic ratio of a dichroic birefringent polymer film according to the present invention, containing a dichroic dye or chromophore which is a rod-like molecule with its transition dipole moment parallel to the long axis of the molecule, as disclosed above or below is given by equation (1)

$$N=A_{\parallel}/A_{\perp} \quad (1)$$

wherein $A_{\parallel}$ is the absorbance parallel to the average direction of the long axis of the dye or chromophore, and $A_{\perp}$ is the absorbance perpendicular to the average direction of the long axis of the dye or chromophore. Unless stated otherwise, the values of $A_{\parallel}$, $A_{\perp}$ and N refer to the operating wavelength range of the polariser and to room temperature.

The birefringence Δn is defined according to equation 2:

$$\Delta n=n_e-n_o \quad (2)$$

wherein $n_e$ is the extraordinary refractive index and $n_o$ is the ordinary refractive index, and the effective average refractive index nav. is given by equation (3):

$$n_{av.}=((2n_o^2+n_e^2)/3)^{1/2} \quad (3)$$

The average refractive index $n_{av.}$ and the ordinary refractive index no can be measured using an Abbe refractometer. Δn can then be calculated from the above equations. Alternatively, the refractive indices can be measured by ellipsometry and Δn can be derived by UV-Vis spectroscopy between crossed polarisers.

The term "director" is known in prior art and means the preferred orientation direction of the long molecular axes (in case of calamitic compounds) or short molecular axes (in case of discotic compounds) of the liquid-crystalline or RM molecules. In case of uniaxial ordering of such anisotropic molecules, the director is the axis of anisotropy.

All physical properties have been and are determined according to "Merck Liquid Crystals, Physical Properties of Liquid Crystals", Status November 1997, Merck KGaA, Germany and are given for a temperature of 20° C., unless explicitly stated otherwise. The optical anisotropy (Δn) is determined at a wavelength of 589.3 nm In case of doubt the definitions as given in C. Tschierske, G. Pelzl and S. Diele, Angew. Chem. 2004, 116, 6340-6368 shall apply.

Unless explicitly stated otherwise in the given generic formulae, the following terms have the following meanings:

"Carbyl group" denotes a mono- or polyvalent organic group containing at least one carbon atom which either contains no further atoms (such as, for example, —C≡C—) or optionally contains one or more further atoms, such as, for example, N, O, S, P, Si, Se, As, Te or Ge (for example carbonyl, etc.). "Hydrocarbyl group" denotes a carbyl group, which additionally contains one or more H atoms and optionally one or more heteroatoms, such as, for example, N, O, S, P, Si, Se, As, Te or Ge.

A carbyl or hydrocarbyl group can be a saturated or unsaturated group. Unsaturated groups are, for example, aryl, alkenyl, or alkynyl groups. A carbyl or hydrocarbyl group having more than 3 C atoms can be straight chain, branched and/or cyclic and may contain spiro links or condensed rings.

Preferred carbyl and hydrocarbyl groups are optionally substituted alkyl, alkenyl, alkynyl, alkoxy, alkylcarbonyl, alkoxycarbonyl, alkylcarbonyloxy and alkoxycarbonyloxy having 1 to 40, preferably 1 to 25, particularly preferably 1 to 18 C atoms, optionally substituted aryl or aryloxy having 6 to 40, preferably 6 to 25 C atoms, or optionally substituted alkylaryl, arylalkyl, alkylaryloxy, arylalkyloxy, arylcarbonyl, aryloxycarbonyl, arylcarbonyloxy and aryloxycarbonyloxy having 6 to 40, preferably 6 to 25 C atoms.

Further preferred carbyl and hydrocarbyl groups are $C_1$-$C_{40}$ alkyl, $C_2$-$C_{40}$ alkenyl, $C_2$-$C_{40}$ alkynyl, $C_3$-$C_{40}$ allyl, $C_4$-$C_{40}$ alkyldienyl, $C_4$-$C_{40}$ polyenyl, $C_6$-$C_{40}$ aryl, $C_6$-$C_{40}$ alkylaryl, $C_6$-$C_{40}$ arylalkyl, $C_6$-$C_{40}$ alkylaryloxy, $C_6$-$C_{40}$ arylalkyloxy, $C_2$-$C_{40}$ heteroaryl, $C_4$-$C_{40}$ cycloalkyl, $C_4$-$C_{40}$ cycloalkenyl, etc. Preference is given to $C_1$-$C_{22}$ alkyl, $C_2$-$C_{22}$ alkenyl, $C_2$-$C_{22}$ alkynyl, $C_3$-$C_{22}$ allyl, $C_4$-$C_{22}$ alkyldienyl, $C_6$-$C_{12}$ aryl, $C_6$-$C_{20}$ arylalkyl, and $C_2$-$C_{20}$ heteroaryl.

Further preferred carbyl and hydrocarbyl groups are straight-chain, branched or cyclic alkyl radicals having 1 to 40, preferably 1 to 25 C atoms, more preferably 1 to 12 C atoms, which are unsubstituted or mono- or polysubstituted by F, Cl, Br, I or CN and in which one or more non-adjacent $CH_2$ groups may each be replaced, independently of one another, by —C($R^x$)═C($R^x$)—, —C≡C—, —N($R^x$)—, —O—, —S—, —CO—, —CO—O— —O—CO—, —O—CO—O— in such a way that O and/or S atoms are not linked directly to one another.

Above, $R^x$ preferably denotes H, halogen, a straight-chain, branched or cyclic alkyl chain having 1 to 25 C atoms, in which, in addition, one or more non-adjacent C atoms may be replaced by —O—, —S—, —CO—, —CO—O—, —O—CO—, —O—CO—O—, and in which one or more H atoms may be replaced by fluorine, an optionally substituted aryl or aryloxy group having 6 to 40 C atoms or an optionally substituted heteroaryl or heteroaryloxy group having 2 to 40 C atoms, preferably H or alkyl having 1 to 12 C atoms.

Preferred alkyl groups are, for example, methyl, ethyl, n-propyl, isopropyl, n-butyl, isobutyl, s-butyl, t-butyl, 2-methylbutyl, n-pentyl, s-pentyl, n-hexyl, 2-ethylhexyl, n-heptyl, n-octyl, n-nonyl, n-decyl, n-undecyl, n-dodecyl, dodecanyl, trifluoromethyl, perfluoro-n-butyl, 2,2,2-trifluoroethyl, perfluorooctyl, perfluorohexyl, etc.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkynyl groups are, for example, ethynyl, propynyl, butynyl, pentynyl, hexynyl, octynyl, etc.

Preferred alkoxy groups are, for example, methoxy, ethoxy, 2-methoxyethoxy, n-propoxy, i-propoxy, n-butoxy, i-butoxy, s-butoxy, t-butoxy, 2-methylbutoxy, n-pentoxy, n-hexoxy, n-heptyloxy, n-octyloxy, n-nonyloxy, n-decyloxy, n-undecyloxy, n-dodecyloxy, etc.

Preferred amino groups are, for example, dimethylamino, methylamino, methylphenylamino, phenylamino, etc.

Aryl and heteroaryl groups can be monocyclic or polycyclic, i.e. they can have one ring (such as, for example, phenyl) or two or more rings, which may also be fused (such as, for example, naphthyl) or covalently linked (such as, for example, biphenyl), or contain a combination of fused and linked rings. Heteroaryl groups contain one or more heteroatoms, preferably selected from O, N, S and Se.

Preference is given to mono-, bi-, or tricyclic aryl groups having 6 to 25 C atoms and mono-, bi- or tricyclic heteroaryl groups having 2 to 25 C atoms, which optionally contain fused rings, and which are optionally substituted. Preference is furthermore given to 5-, 6- or 7-membered aryl and heteroaryl groups, in which, in addition, one or more CH groups may be replaced by N, S or O in such a way that O atoms and/or S atoms are not linked directly to one another.

Preferred aryl groups are, for example, phenyl, biphenyl, terphenyl, [1,1':3',1"]terphenyl-2'-yl, naphthyl, anthracene, binaphthyl, phenanthrene, pyrene, dihydropyrene, chrysene, perylene, tetracene, pentacene, benzopyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b] thiophene, dithienothiophene, isobenzothiophene, dibenzothiophene, benzothiadiazothiophene, or combinations of these groups. The heteroaryl groups may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those that contain exclusively single bonds, and partially unsaturated rings, i.e. those that may also contain multiple bonds. Heterocyclic rings contain one or more heteroatoms, preferably selected from Si, O, N, S and Se.

The (non-aromatic) alicyclic and heterocyclic groups can be monocyclic, i.e. contain only one ring (such as, for example, cyclohexane), or polycyclic, i.e. contain a plurality of rings (such as, for example, decahydronaphthalene or bicyclooctane). Preference is given to saturated groups. Preference is furthermore given to mono-, bi-, or tricyclic groups having 3 to 25 C atoms, which optionally contain fused rings and which are optionally substituted. Preference is furthermore given to 5-, 6-, 7- or 8-membered carbocyclic groups in which, in addition, one or more C atoms may be replaced by Si and/or one or more CH groups may be replaced by N and/or one or more non-adjacent $CH_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]pentane-1,3-diyl, bicyclo[2.2.2]octane-1,4-diyl, spiro[3.3]heptane-2,6-diyl, octahydro-4,7-methanoindane-2,5-diyl.

The aryl, heteroaryl, (non-aromatic) alicyclic and heterocyclic groups optionally have one or more substituents, which are preferably selected from the group comprising silyl, sulfo, sulfonyl, formyl, amine, imine, nitrile, mercapto, nitro, halogen, $C_1$-$C_{12}$ alkyl, $C_6$-$C_{12}$ aryl, $C_1$-$C_{12}$ alkoxy, hydroxyl, or combinations of these groups.

Preferred substituents are, for example, solubility-promoting groups, such as alkyl or alkoxy, electron-withdrawing groups, such as fluorine, nitro or nitrile, or substituents for increasing the glass transition temperature (Tg) in the polymer, in particular bulky groups, such as, for example, t-butyl or optionally substituted aryl groups.

Preferred substituents, also referred to as "L" below, are, for example, F, Cl, Br, I, —OH, —CN, —$NO_2$, —NCO, —NCS, —OCN, —SCN, —C(═O)N($R^x$)$_2$, —C(═O)$Y^x$, —C(═O)$R^x$, —C(═O)O$R^x$, —N($R^x$)$_2$, in which $R^x$ has the above-mentioned meaning, and above Yx denotes halogen, optionally substituted silyl, optionally substituted aryl or heteroaryl having 4 to 40, preferably 4 to 20 ring atoms, and straight-chain or branched alkyl, alkenyl, alkynyl, alkoxy, alkylcarbonyl, alkoxycarbonyl, alkylcarbonyloxy or alkoxycarbonyloxy having 1 to 25 C atoms, in which one or more H atoms may optionally be replaced by F or Cl.

"Substituted silyl or aryl" preferably means substituted by halogen, —CN, $R^y$, —O$R^y$, —CO—$R^y$, —CO—O—$R^y$, —O—CO—$R^y$ or —O—CO—O—$R^y$, in which $R^y$ denotes H, a straight-chain, branched or cyclic alkyl chain having 1 to 12 C atoms.

If in the formulae above and below a group or substituent denotes an alkyl or alkoxy radical, i.e. where the terminal $CH_2$ group is replaced by —O—, this may be straight-chain or branched. It is preferably straight-chain, has 2, 3, 4, 5, 6, 7 or 8 carbon atoms and accordingly is preferably ethyl, propyl, butyl, pentyl, hexyl, heptyl, octyl, ethoxy, propoxy, butoxy, pentoxy, hexoxy, heptoxy, or octoxy, furthermore methyl, nonyl, decyl, undecyl, dodecyl, tridecyl, tetradecyl, pentadecyl, methoxy, nonoxy, decoxy, undecoxy, dodecoxy, tridecoxy or tetradecoxy, for example.

Oxaalkyl, i.e. where one $CH_2$ group is replaced by —O—, is preferably straight-chain 2-oxapropyl (=methoxymethyl), 2-(=ethoxymethyl) or 3-oxabutyl (=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2-, 3-, 4-, 5- 6-, 7- or 8-oxanonyl or 2-, 3-, 4-, 5-, 6-, 7-, 8- or 9-oxadecyl, for example.

L is preferably F, Cl, CN, $NO_2$, $CH_3$, $C_2H_5$, $OCH_3$, $OC_2H_5$, $COCH_3$, $COC_2H_5$, $CF_3$, $OCF_3$, in particular F, Cl, CN, $CH_3$, $C_2H_5$, $OCH_3$, $COCH_3$ and $OCF_3$, most preferably F, $CH_3$, $OCH_3$ and $COCH_3$.

In the formulae shown above and below, a substituted phenylene ring

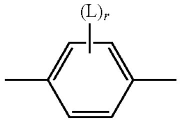

is preferably

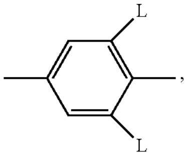, 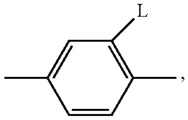, 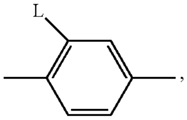,

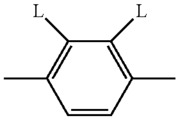, 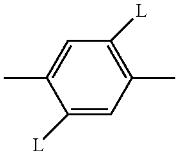 or

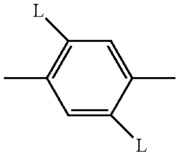, in which L has, on each occurrence identically or differently, one of the meanings given above and below, and is preferably F, Cl, CN, $NO_2$, $CH_3$, $C_2H_5$, $C(CH_3)_3$, $CH(CH_3)_2$, $CH_2CH(CH_3)C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$ or P-Sp-, very preferably F, Cl, CN, $CH_3$, $C_2H_5$, $OCH_3$, $COCH_3$, $OCF_3$ or P-Sp-, most preferably F, Cl, $CH_3$, $OCH_3$, $COCH_3$ or $OCF_3$.

"Halogen" denotes F, Cl, Br or I, preferably F or Cl, more preferably F.

"Polymerisable groups" (P) are preferably selected from groups containing a C═C double bond or C≡C triple bond, and groups which are suitable for polymerisation with ring opening, such as, for example, oxetane or epoxide groups.

Preferably, polymerisable groups (P) are selected from the group consisting of $CH_2$═$CW^1$—COO—, $CH_2$═$CW^1$—CO—,

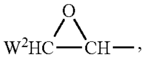, 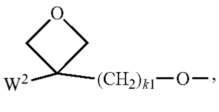, 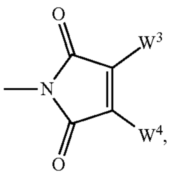,

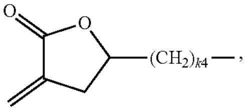, $CH_2$═$CW^2$—$(O)_{k3}$—, $CW^1$═CH—CO—$(O)_{k3}$—, $CW^1$═CH—CO—NH—, $CH_2$═$CW^1$—CO—NH—, $CH_3$—CH═CH—O—, $(CH_2$═$CH)_2$CH—OCO—, $(CH_2$═CH—$CH_2)_2$CH—OCO—, $(CH_2$═$CH)_2$CH—O—, $(CH_2$═CH—$CH_2)_2$N—, $(CH_2$═CH—$CH_2)_2$N—C—, $CH_2$═$CW^1$—CO—NH—, $CH_2$═CH—$(COO)_{k1}$-Phe-$(O)_{k2}$—, $CH_2$═CH—$(CO)_{k1}$-Phe-$(O)_{k2}$—, Phe-CH═CH—, in which $W^1$ denotes H, F, Cl, CN, $CF_3$, phenyl or alkyl having 1 to 5 C atoms, in particular H, F, Cl or $CH_3$, $W^2$ denotes H or alkyl having 1 to 5 C atoms, in particular H, methyl, ethyl, or n-propyl, $W^3$ and $W^4$ each, independently of one another, denote H, Cl or alkyl having 1 to 5 C atoms, Phe denotes 1,4-phenylene, which is optionally substituted by one or more radicals L as being defined above but being different from P-Sp, preferably preferred substituents L are F, Cl, CN, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$, furthermore phenyl, and $k_1$, $k_2$ and $k_5$ each, independently of one another, denote 0 or 1, $k_3$ preferably denotes 1, and $k_4$ is an integer from 1 to 10.

Particularly preferred polymerisable groups P are $CH_2$═CH—COO—, $CH_2$═$C(CH_3)$—COO—. $CH_2$═CF—COO—, $CH_2$═CH—, $CH_2$═CH—O—, $(CH_2$═$CH)_2$CH—OCO—, $(CH_2$═$CH)_2$CH—O—,

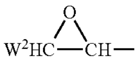 and 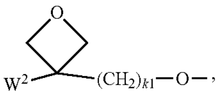, in which $W^2$ denotes H or alkyl having 1 to 5 C atoms, in particular H, methyl, ethyl or n-propyl, Further preferred polymerisable groups (P) are vinyloxy, acrylate, methacrylate, fluoroacrylate, chloroacrylate, oxetane and epoxide, most preferably acrylate or methacrylate, in particular acrylate.

Preferably, all multireactive polymerisable compounds and sub-formulae thereof contain instead of one or more radicals P-Sp-, one or more branched radicals containing two or more polymerisable groups P (multireactive polymerisable radicals).

Suitable radicals of this type, and polymerisable compounds containing them, are described, for example, in U.S. Pat. No. 7,060,200 B1 or US 2006/0172090 A1.

Preference is given to multireactive polymerisable radicals selected from the following formulae:

—X-alkyl-$CHP^x$—$CH_2$—$CH_2P^y$ I*a

—X-alkyl-$C(CH_2P^x)(CH_2P^y)$—$CH_2P^z$ I*b

—X-alkyl-$CHP^xCHP^y$—$CH_2P^z$ I*c

—X-alkyl-$C(CH_2P^x)(CH_2P^y)$—$C_{aa}H_{2aa+1}$ I*d

—X-alkyl-$CHP^x$—$CH_2P^y$ I*e

—X-alkyl-$CHP^xP^y$ I*f

—X-alkyl-$CP^xP^y$—$C_{aa}H_{2aa+1}$ I*g

—X-alkyl-$C(CH_2P^v)(CH_2P^w)$—$CH_2OCH_2$—$C(CH_2P^x)(CH_2P^y)CH_2P^z$ I*h

—X-alkyl-$CH((CH_2)_{aa}P^x)((CH_2)_{bb}P^y)$ I*i

—X-alkyl-$CHP^xCHP^y$—$C_{aa}H_{2aa+1}$ I*k in which alkyl denotes a single bond or straight-chain or branched alkylene having 1 to 12 C atoms, in which one or more non-adjacent $CH_2$ groups may each be replaced, independently of one another, by —C($R^x$)═C($R^x$)—, —C≡C—, —N($R^x$)—, —O—, —S—, —CO—, —CO—O—, —O—CO—, —O—CO—O— in such a way that O and/or S atoms are not linked directly to one another, and in which, in addition, one or more H atoms may be replaced by F, Cl or CN, where $R^x$ has one the above-mentioned meaning, aa and bb each, independently of one another, denote 0, 1, 2, 3, 4, 5 or 6, X has one of the meanings indicated for X', and $P^y$ to $P^z$ each, independently of one another, have one of the meanings indicated above for P.

Preferred spacer groups Sp and $Sp^{1-4}$ are selected from the formula Sp'—X', so that the radical "P-Sp-" conforms to the formula "P-Sp'—X'—", where Sp' denotes alkylene having 1 to 20, preferably 1 to 12 C atoms, which is optionally mono- or polysubstituted by F, Cl, Br, I or CN and in which, in addition, one or more non-adjacent $CH_2$ groups may each be replaced, independently of one another, by —O—, —S—, —NH—, —$NR^x$—, —$SiR^xR^y$—, —CO—, —COO—, —OCO—, —OCO—O—, —S—CO—, —CO—S—, —$NR^x$—CO—O—, —O—CO—$NR^x$—, —$NR^x$—CO—$NR^y$—, —CH═CH— or —C≡C— in such a way that O and/or S atoms are not linked directly to one another, X' denotes —O—, —S—, —CO—, —COO—, —OCO—, —O—COO—, —CO—$NR^x$—, —$NR^x$—CO—, —$NR^x$—CO—$NR^y$—, —$OCH_2$—, —$CH_2O$—, —$SCH_2$—, —$CH_2S$—, —$CF_2O$—, —$OCF_2$—, —$CF_2S$—, —$SCF_2$—, —$CF_2CH_2$—, —$CH_2CF_2$—, —$CF_2CF_2$—, —CH═N—, —N═CH—, —N═N—, —CH═$CR^x$—, —$CY^x$═$CY^x$—, —C≡C—, —CH═CH—COO—, —OCO—CH═CH— or a single bond, $R^x$ and $R^y$ each, independently of one another, denote H or alkyl having 1 to 12 C atoms, and $Y^x$ and $Y^y$ each, independently of one another, denote H, F, Cl or CN.

X' is preferably —O—, —S—, —CO—, —COO—, —OCO—, —O—COO—, —CO—$NR^x$—, —$NR^x$—CO—, —$NR^x$—CO—$NR^y$— or a single bond.

Typical spacer groups Sp' are, for example, —$(CH_2)_{p1}$—, —$(CH_2CH_2O)_{q1}$—$CH_2CH_2$—, —$CH_2CH_2$—S—$CH_2CH_2$—, —$CH_2CH_2$—NH—$CH_2CH_2$— or —($SiR^xR^y$—O)$_{p1}$—, in which p1 is an integer from 1 to 20, q1 is an integer from 1 to 3, and $R^x$ and $R^y$ have the above-mentioned meanings.

Particularly preferred groups —X'-Sp'- are —$(CH_2)_{p1}$—, —O—$(CH_2)_{p1}$—, —OCO—$(CH_2)_{p1}$—, —OCOO—$(CH_2)_{p1}$—, in which p1 is an integer from 1 to 20, preferably from 5 to 15.

Particularly preferred groups Sp' are, for example, in each case straight-chain, methylene, ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

For the present invention,

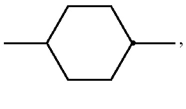,
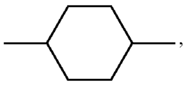,

-continued

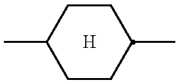
and
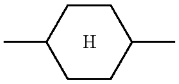

denote trans-1,4-cyclohexylene, and

and
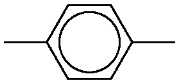

denote 1,4-phenylene.

For the present invention the groups —COO—, —C(═O)O— or —$CO_2$— denote an ester group of formula

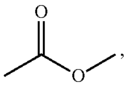, and the groups —OCO—, —OC(═O)—, —$O_2C$— or —OOC— denote an ester group of formula

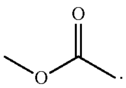.

All concentrations are quoted in percent by weight (w/w) and relate to the respective mixture as a whole, all temperatures are quoted in degrees Celsius, and all temperature differences are quoted in differential degrees.

Unless the context clearly indicates otherwise, as used herein plural forms of the terms herein are to be construed as including the singular form and vice versa.

Throughout the description and claims of this specification, the words "comprise" and "contain" and variations of the words, for example "comprising" and "comprises", mean "including but not limited to", and are not intended to (and do not) exclude other components. On the other hand, the word "comprise" also encompasses the term "consisting of" but is not limited to it.

Throughout the description and claims of this specification, the words "obtainable" and "obtained" and variations of the words, mean "including but not limited to", and are not intended to (and do not) exclude other components. On the other hand, the word "obtainable" also encompasses the term "obtained" but is not limited to it.

DETAILED DESCRIPTION OF THE INVENTION

The present invention provides a polymerisable LC medium comprising one or more polymerisable liquid crystal or mesogenic compounds, hereinafter also referred to as "reactive mesogens" or "RMs", which are mono-, di- or multireactive, and further comprising at least one polymerisable oligomeric liquid crystal or mesogenic compound, hereinafter also simply referred to as "oligomer". The polymerisable LC medium is hereinafter also referred to as "RM mixture" or "RMM".

Preferably the RM mixture has a smectic phase, more preferably at least one smectic phase that is different from a smectic A and smectic C phase, very preferably a smectic B phase. More preferably the RM mixture shows mesophase behaviour including the sequence nematic—smectic A—smectic B with decreasing temperature.

The present invention also provides a method to create a planar smectic coating applied on a single substrate and provide a new principle to maintain the planar alignment when the RM mixture is cooled to its smectic state. In a preferred embodiment the RM mixture shows the following sequence of phases:

nematic-smectic A-smectic B

This sequence is especially suitable to create defect-free smectic B alignments. The monomer will be processed and aligned in its nematic phase and then, by cooling and going through the smectic A phase, be converted into a smectic B phase which is then frozen by polymerisation, preferably by UV photopolymerisation.

To overcome the problem of the loss of planar alignment in the transition from nematic to the smectic phases, a small amount of an oligomeric liquid crystal is added to the RM mixture. The oligomer co-aligns with the RM mixture and, because of its presence, realignment is retarded or even totally prohibited, even when the coating is applied in its nematic state and is cooled to the desired smectic state prior to its polymerisation. Consequently, the coating can be polymerised by UV exposure to permanently fix the smectic orientation.

The polymerisable oligomeric liquid crystal or mesogenic compounds are preferably selected from formula O.

Preferred compounds of formula O are selected from the following preferred embodiments, including any combination thereof:

- $P^1$ and $P^2$ are selected from vinyloxy, acrylate, methacrylate, fluoroacrylate, chloroacrylate, oxetane and epoxide, most preferably acrylate or methacrylate, in particular acrylate,
- $Sp^1$ and $Sp^2$ are selected from —$(CH_2)_{p1}$—, —O—$(CH_2)_{p1}$—, —OCO—$(CH_2)_{p1}$—, —OCOO—$(CH_2)_{p1}$—, in which p1 is an integer from 1 to 20, very preferably from 5 to 15,
- $Z^1$ is selected from —COO—, —OCO—, —$CH_2CH_2$— or a single bond,
- a is 1, 2 or 3, preferably 1 or 2,
- E denotes alkylene having 3 to 12 C atoms wherein two non-adjacent $CH_2$ groups are replaced by —S— or —$NR^x$— in such a way that O and/or S and/or N atoms are not linked directly to one another, wherein $R^x$ has the meanings given above and is preferably H,
- E denotes —S—$(CH_2CH_2O)_e$—$CH_2CH_2$—S—, wherein e is 1, 2 or 3, preferably 2,
- the mesogenic group $MG^1$ is selected from the following formulae:

MG-1

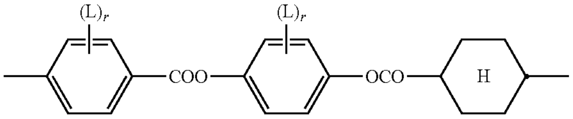

MG-2

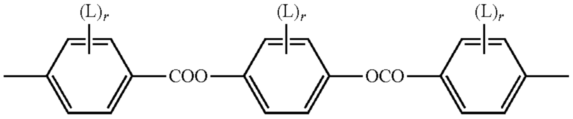

MG-3

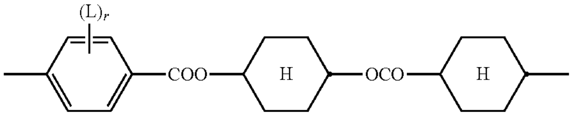

wherein L and r have the meanings given in formula DRMa-DRMf or one of the preferred meanings given above and below.

Especially preferred compounds of formula O are selected from the formula O1:

O1

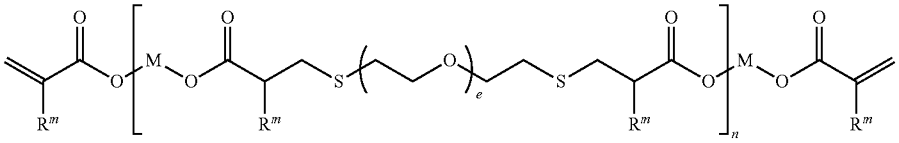

- $Sp^3$ and $Sp^4$ are selected from —O—CO—$CH_2CH_2$— and —$CH_2$—$CH_2$—CO—O—, wherein $Sp^3$ and $Sp^4$ are connected to E in such a way that O and/or S atoms are not linked directly to one another,
- $X^1$ and $X^2$ denote —S—, —O— or NH, preferably —S—,
- $A^1$ and $A^2$ are selected from 1,4-phenylene, pyridine-2,5-diyl, pyrimidine-2,5-diyl, thiophene-2,5-diyl, naphthalene-2,6-diyl, 1,2,3,4-tetrahydro-naphthalene-2,6-diyl, indane-2,5-diyl, bicyclooctylene or 1,4-cyclohexylene wherein one or two non-adjacent $CH_2$ groups are optionally replaced by O and/or S, very preferably from 1,4-phenylene, naphthalene-2,6-diyl or 1,4-cyclohexylene, wherein all the aforementioned groups are unsubstituted or substituted by 1, 2, 3 or 4 groups L as defined above, wherein n is as defined in formula O, e is 1, 2, 3 or 4, preferably 2, $R^m$ is H or $CH_3$, preferably H, and M is selected from the following formulae:

M-1

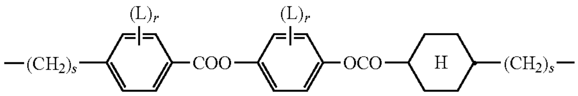

M-2

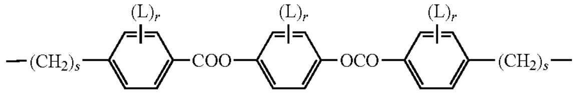

-continued

M-3

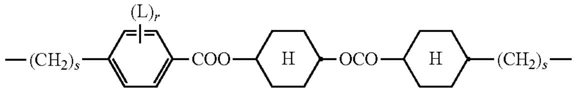

wherein L and r have the meanings given in formula DRMa-DRMf or one of the preferred meanings given above and below, and s is an integer from 1 to 20, preferably from 5 to 15.

Especially preferred are compounds of formula O1 wherein e is 2, M is of formula M-1 or M-2, most preferably of formula M-1, s is 6, 7, 8, 9, 10, 11 or 12, most preferably 6 or 11, and r is 0.

Preferably the oligomer has a smectic phase, more preferably at least one smectic phase that is different from a smectic A and smectic C phase, very preferably a smectic B phase. More preferably the oligomer shows mesophase behaviour including the sequence nematic-smectic A-smectic B with decreasing temperature.

In another preferred embodiment the oligomer has a nematic and/or smectic A phase but does not exhibit a smectic B phase.

Another object of the present invention are novel oligomers of formula O and its preferred embodiments, in particular those of formula O1.

The concentration of the oligomer(s) in the RM mixture is preferably from 0.05 to 15%, more preferably from 0.1 to 10%, most preferably from 0.1 to 5% by weight.

The oligomers according to the present invention, especially those of formula O and O1, can be synthesized by known methods known to the skilled person and described in the literature.

A preferred process of preparing the oligomer of formula O, where $P^1$ and $P^2$ denote an acrylate or methacrylate group, includes the step of reacting a diacrylate or dimethacrylate of formula MD $H_2C{=}CH{-}CO{-}O\text{-}Sp^1\text{-}MG^1\text{-}Sp^2\text{-}O{-}CO{-}CH{=}CH_2$ MD wherein $Sp^1$, $Sp^2$ and $MG^1$ have the meanings given in formula O or one of the preferred meanings given above and below, and $R'''$ denotes H or $CH_3$, preferably H, with a dithiol, dialcohol or diamine compound of formula DT $HX^1\text{-}E\text{-}X^2H$ DT wherein $X^1$, $X^2$ and E have the meanings given in formula O or one of the preferred meanings given above and below, in the presence of catalyst.

A preferred process of the present invention relates to the preparation of an oligomer of formula O1 and includes the step of reacting a diacrylate or dimethacrylate of formula MD selected from subformula MD1

$H_2C{=}CR'''{-}CO{-}O\text{-}M\text{-}O{-}CO{-}CR'''{=}CH_2$ MD1 wherein M is selected from formulae M-1, M-2 and M-3 as defined above, and $R'''$ is H or $CH_3$, preferably H with a compound of formula DT selected from subformula DT1

$HS{-}(CH_2CH_2O)_e{-}CH_2CH_2{-}SH$ DT1 wherein e is 1, 2, 3 or 4, preferably 2, in the presence of catalyst.

The processes as described above are further objects of the present invention.

The oligomer according to the present invention preferably has a number average molecular weight Mn (determined through $^1H$-NMR analysis) from 1000 to 20000, more preferably form 1500 to 10000, and a polydispersity index PDI (determined by gel permeation chromatography (GPC), with tetrahydrofuran (THF) as eluent versus polystyrene standards) from 1.5 to 4, more preferably from 1.6 to 3.5.

Apart of the oligomer(s) the polymerisable LC medium according to the present invention further comprises one or more mono-, di- or multireactive RMs.

In preferred embodiment, the polymerisable LC medium comprises one or more di- or multireactive RMs that are preferably selected of formula DRM $P^1\text{-}Sp^1\text{-}MG\text{-}Sp^2\text{-}P^2$ DRM wherein $P^1$ and $P^2$ independently of each other denote a polymerisable group, $Sp^1$ and $Sp^2$ independently of each other are a spacer group or a single bond, and MG is a rod-shaped mesogenic group, which is preferably selected of formula M $\text{-}(A^1\text{-}Z^1)_n\text{-}A^2\text{-}$ M wherein $A^1$ and $A^2$ denote, in case of multiple occurrence independently of one another, an aromatic or alicyclic group, which optionally contains one or more heteroatoms selected from N, O and S, and is optionally mono- or polysubstituted by L, L is P-Sp-, F, Cl, Br, I, —CN, —$NO_2$, —NCO, —NCS, —OCN, —SCN, —C(=O)$NR^xR^y$, —C(=O)$OR^x$, —C(=O)$R^x$, —$NR^xR^y$, —OH, —$SF_5$, optionally substituted silyl, aryl or heteroaryl with 1 to 12, preferably 1 to 6 C atoms, and straight chain or branched alkyl, alkoxy, alkylcarbonyl, alkoxycarbonyl, alkylcarbonyloxy or alkoxycarbonyloxy with 1 to 12, preferably 1 to 6 C atoms, wherein one or more H atoms are optionally replaced by F or Cl, $R^x$ and $R^y$ independently of each other denote H or alkyl with 1 to 12 C-atoms, $Z^1$ denotes, in case of multiple occurrence independently of one another, —O—, —S—, —CO—, —COO—, —OCO—, —S—CO—, —CO—S—, —O—COO—, —CO—$NR^x$—, —$NR^x$—CO—, —$NR^x$—CO—$NR^y$, —$NR^x$—CO—O—, —O—CO—$NR^x$—, —$OCH_2$—, —$CH_2O$—, —$SCH_2$—, —$CH_2S$—, —$CF_2O$—, —$OCF_2$—, —$CF_2S$—, —$SCF_2$—, —$CH_2CH_2$—, —$(CH_2)_{n1}$, —$CF_2CH_2$—, —$CH_2CF_2$—, —$CF_2CF_2$—, —CH=N—, —N=CH—, —N=N—, —CH=$CR^x$—, —$CY^1$=$CY^2$—, —C≡C—, —CH=CH—COO—, —OCO—CH=CH— or a single bond, preferably —COO—, —OCO— or a single bond, $Y^1$ and $Y^2$ independently of each other denote H, F, Cl or CN, n is 1, 2, 3 or 4, preferably 1 or 2, most preferably 2, n1 is an integer from 1 to 10, preferably 1, 2, 3 or 4.

Preferred groups $A^1$ and $A^2$ include, without limitation, furan, pyrrole, thiophene, oxazole, thiazole, thiadiazole, imidazole, phenylene, cyclohexylene, bicyclooctylene, cyclohexenylene, pyridine, pyrimidine, pyrazine, azulene, indane, fluorene, naphthalene, tetrahydronaphthalene, anthracene, phenanthrene and dithienothiophene, all of which are unsubstituted or substituted by 1, 2, 3 or 4 groups L as defined above.

Particular preferred groups A1 and A2 are selected from 1,4-phenylene, pyridine-2,5-diyl, pyrimidine-2,5-diyl, thiophene-2,5-diyl, naphthalene-2,6-diyl, 1,2,3,4-tetrahydronaphthalene-2,6-diyl, indane-2,5-diyl, bicyclooctylene or 1,4-cyclohexylene wherein one or two non-adjacent $CH_2$ groups are optionally replaced by O and/or S, wherein these groups are unsubstituted or substituted by 1, 2, 3 or 4 groups L as defined above.

Preferred RMs of formula DRM are selected from the following formulae:

DRMa

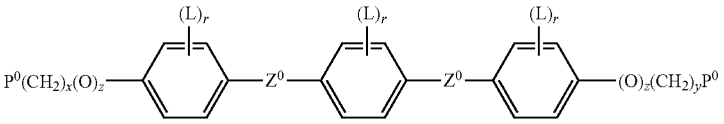

DRMb

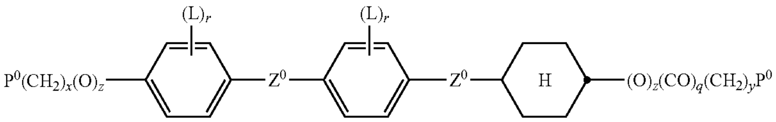

DRMc

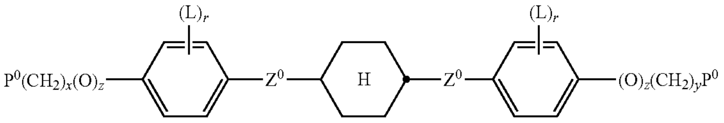

DRMd

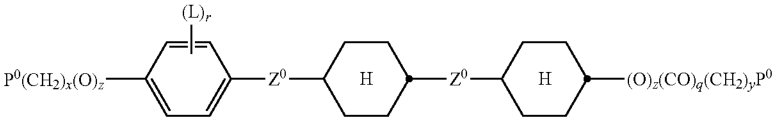

DRMe

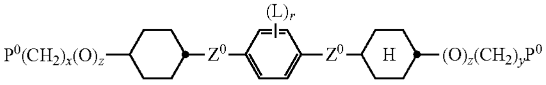

DRMf

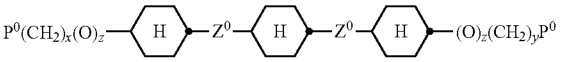

wherein $P^0$ is, in case of multiple occurrence independently of one another, a polymerisable group, preferably an acryl, methacryl, oxetane, epoxy, vinyl, heptadiene, vinyloxy, propenyl ether or styrene group, $Z^0$ is —COO—, —OCO—, —$CH_2CH_2$—, —$CF_2O$—, —$OCF_2$—, —C≡C—, —CH═CH—, —OCO—CH═CH—, —CH═CH—COO—, or a single bond, preferably —COO—, —OCO—, —$CH_2CH_2$— or a single bond, L has on each occurrence identically or differently one of the meanings given for $L^1$ in formula DRM, and is preferably, in case of multiple occurrence independently of one another, selected from F, Cl, CN or optionally halogenated alkyl, alkoxy, alkylcarbonyl, alkoxycarbonyl, alkylcarbonyloxy or alkoxycarbonyloxy with 1 to 5 C atoms, r is 0, 1, 2, 3 or 4, q is 0 or 1, with q being 0 if the adjacent y is 0 x and y are independently of each other 0 or identical or different integers from 1 to 20, preferably from 5 to 15, z is 0 or 1, with z being 0 if the adjacent x or y is 0.

Further preferred RMs of formula DRM are selected from the following formulae:

DRMa1

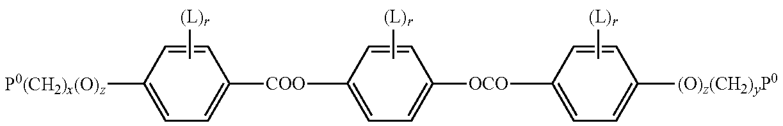

DRMa2

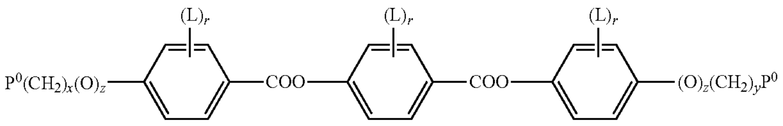

DRMa3

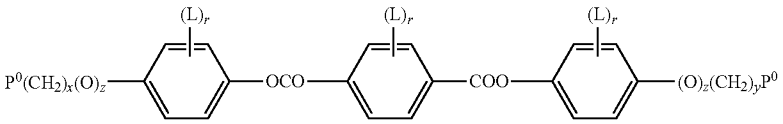

-continued
DRMa4
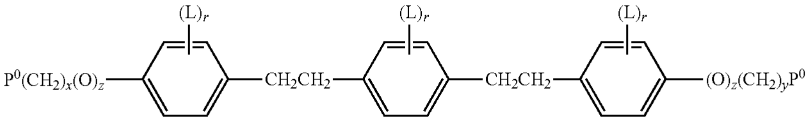
DRMa5
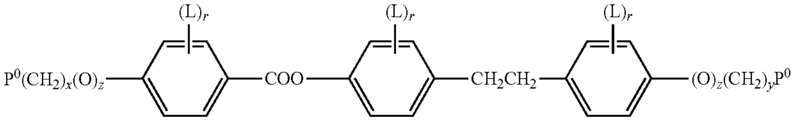
DRMa6
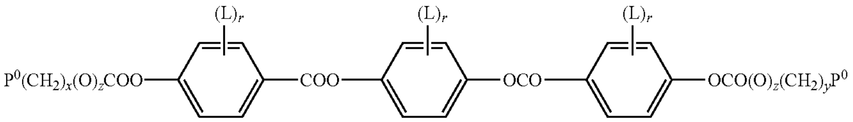
DRMa7
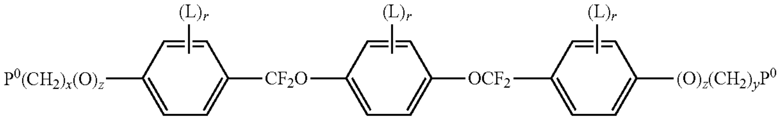
DRMa8
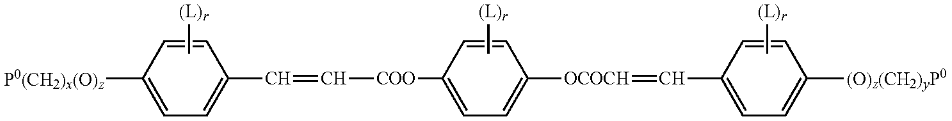
DRMb1
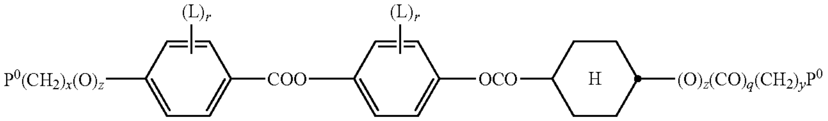
DRMb2
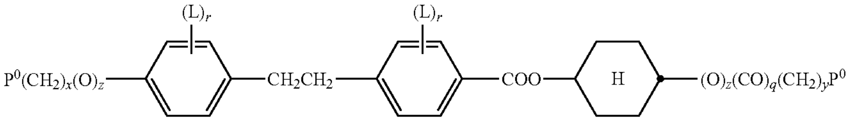
DRMb3
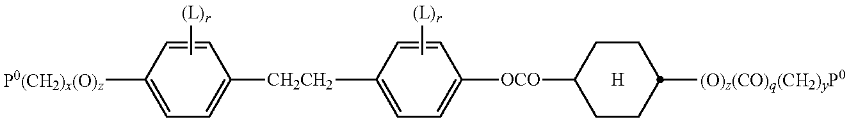
DRMc1
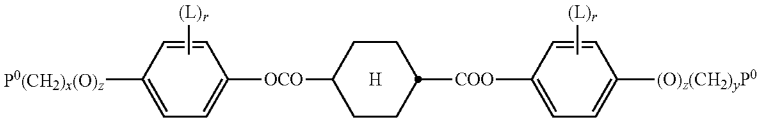
DRMc2
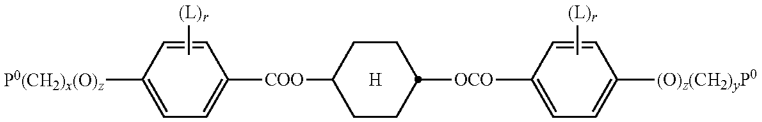
DRMd1
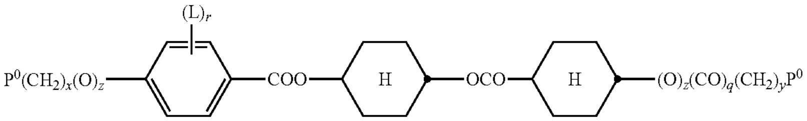
DRMe1
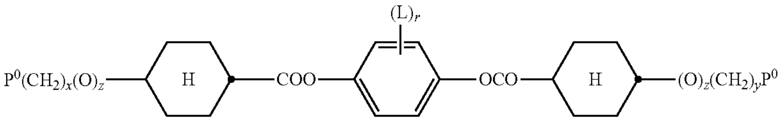

-continued

DRMf1

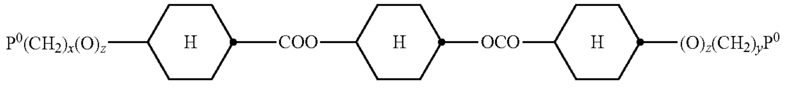

wherein $P^0$, L, r, q, x, y and z are as defined in formula DRMa and DMRb, and q is 0 or 1.

Especially preferred are compounds of formula DRMa1, DRMa4, DRMa5, DRMb1, DRMb2, DRMb3, DRMc1 and DRMc2, in particular those of formula DRMb2 and DRMc1.

Further preferred are compounds of formulae DRMa to DRMf and their subformulae wherein x and/or y denote independently of each other an integer from 5 to 15, preferably from 6 to 12. The use of such compounds with longer alkylene spacers in the RM mixture is expected to enhance smectic phase behaviour, especially smectic phases with high degree of order, such as a smectic B phase, in the RM mixture.

The concentration of di- or multireactive RMs, preferably selected from formula DRM, very preferably selected from formulae DRMa to DRMf and their subformulae, in the polymerisable LC medium is preferably from 5% to 65%, more preferably from 10 to 60%, very preferably from 20 to 55% by weight.

In preferred embodiment, in addition or alternatively to the di- or multireactive RMs, preferably in addition to RMs selected from formulae DRMa to DRMf and their subformulae, the polymerisable LC medium comprises one or more monoreactive RMs.

The monoreactive RMs are preferably selected from compounds of formula MRM:

$P^1$-$Sp^1$-MG-R MRM wherein $P^1$, $Sp^1$ and MG have the meanings given in formula DRM, R denotes P-Sp-, F, Cl, Br, I, —CN, —$NO_2$, —NCO, —NCS, —OCN, —SCN, —C(═O)$NR^xR^y$, —C(═O)X, —C(═O)$OR^x$, —C(═O)$R^y$, —$NR^xR^y$, —OH, —$SF_5$, optionally substituted silyl, straight chain or branched alkyl, alkoxy, alkylcarbonyl, alkoxycarbonyl, alkylcarbonyloxy or alkoxycarbonyloxy with 1 to 12, preferably 1 to 6 C atoms, wherein one or more H atoms are optionally replaced by F or Cl, X is halogen, preferably F or Cl, and $R^x$ and $R^y$ are independently of each other H or alkyl with 1 to 12 C-atoms.

Preferably the RMs of formula MRM are selected from the following formulae.

MRM1

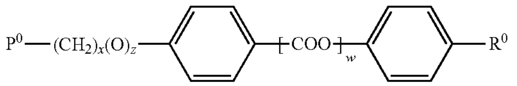

MRM2

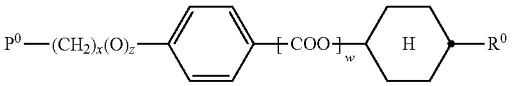

MRM3

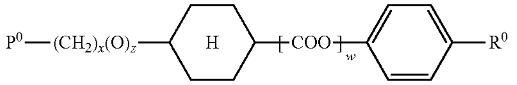

MRM4

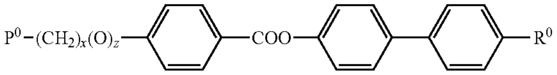

MRM5

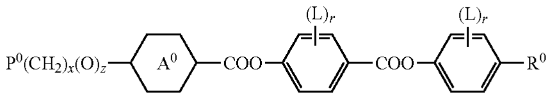

MRM6

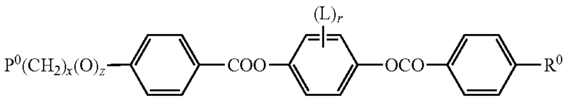

MRM7

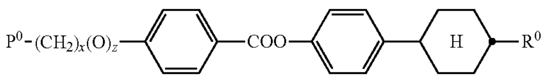

MRM8

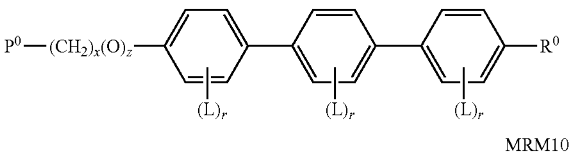

MRM9

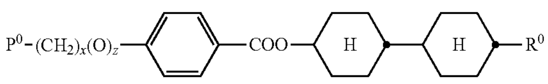

MRM10

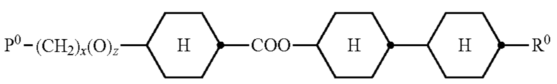

MRM11

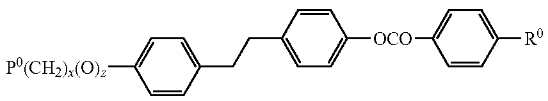

MRM12

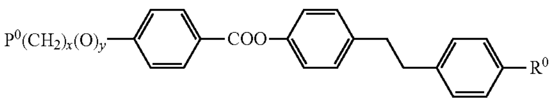

-continued

MRM13

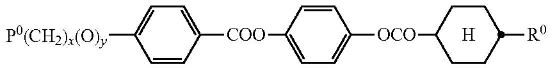

MRM14

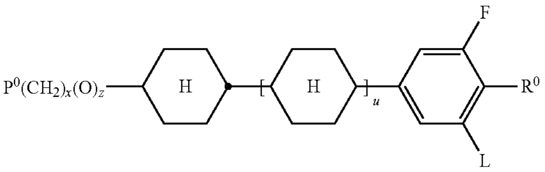

MRM15

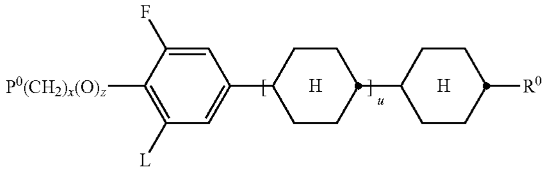

MRM16

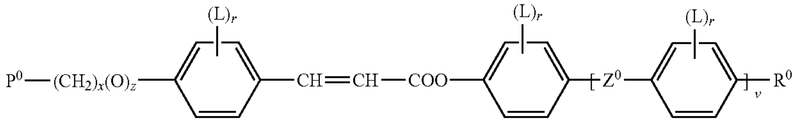

MRM17

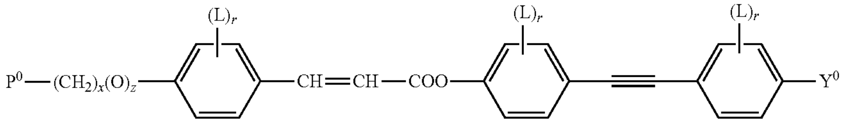

MRM18

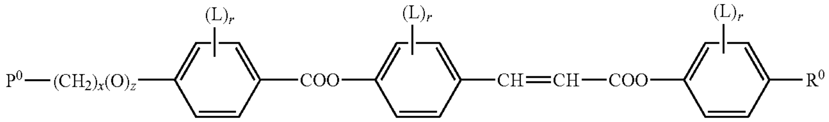

MRM19

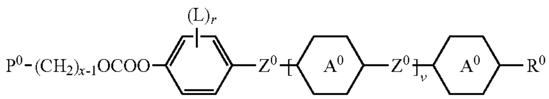

MRM20

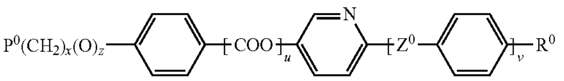

MRM21

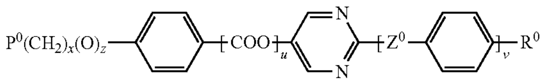

MRM22

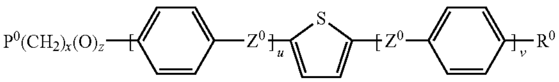

MRM23

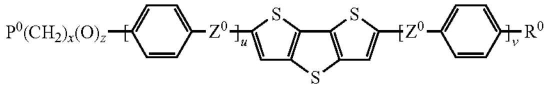

MRM24

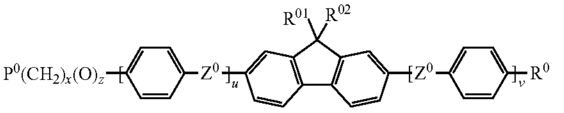

MRM25

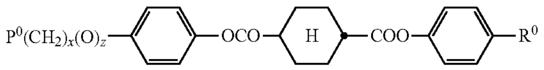

MRM26

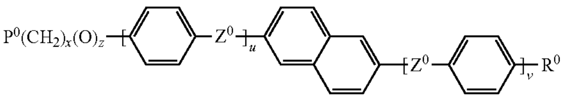

MRM27

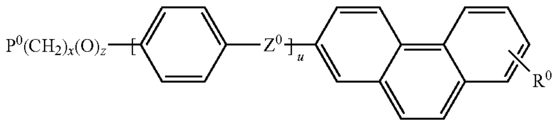

wherein $P^0$, L, r, x, y and z have the meanings given in formula DRMa and DRMb or one of the preferred meanings given above and below, $R^0$ is alkyl, alkoxy, thioalkyl, alkylcarbonyl, alkoxycarbonyl, alkylcarbonyloxy or alkoxycarbonyloxy with 1 or more, preferably 1 to 15 C atoms or denotes $Y^0$, $X^0$ is —O—, —S—, —CO—, —COO—, —OCO—, —O—COO—, —CO—$NR^{01}$—, —$NR^{01}$—CO—, —$NR^{01}$—CO—$NR^{01}$—, —$OCH_2$, —$CH_2O$—, —$SCH_2$—, —$CH_2S$—, —$CF_2O$—, —$OCF_2$—, —$CF_2S$—, —$SCF_2$—, —$CF_2CH_2$—, —$CH_2CF_2$—, —$CF_2CF_2$—, —CH═N—, —N═CH—, —N═N—, —CH═$CR^{01}$—, —CF═CF—, —C≡C—, —CH═CH—COO—, —OCO—CH═CH— or a single bond, $Y^0$ is F, Cl, CN, $NO_2$, $OCH_3$, OCN, SCN, $SF_5$, or mono-oligo- or polyfluorinated alkyl or alkoxy with 1 to 4 C atoms, $Z^0$ is —COO—, —OCO—, —$CH_2CH_2$—, —$CF_2O$—, —$OCF_2$—, —CH═CH—, —OCO—CH═CH—, —CH⊚CH—COO—, or a single bond, $A^0$ is, in case of multiple occurrence independently of one another, 1,4-phenylene that is unsubstituted or substituted with 1, 2, 3 or 4 groups L, or trans-1,4-cyclohexylene, $R^{01,02}$ are independently of each other H, $R^0$ or $Y^0$, u and v are independently of each other 0, 1 or 2, w is 0 or 1, and wherein the benzene and naphthalene rings can additionally be substituted with one or more identical or different groups L.

Especially preferred are compounds of formula MRM1 to MRM15, in particular those of formula MRM1, MRM2, MRM3, MRM5, MRM7, MRM9, MRM10, MRM12, MRM12 and MRM13. Very preferred are the compounds of formulae MRM1, MRM7, MRM11, MRM12 and MRM13.

The concentration of monoreactive RMs, preferably those selected from formula MRM, very preferably those selected from formulae MRM1 to MRM15, in the polymerisable LC medium is preferably from 5 to 80%, more preferably from 10 to 75%, very preferably from 20 to 65% by weight.

In a preferred embodiment, the proportion of polymerisable mesogenic compounds in the polymerisable LC medium according to the present invention as a whole, is in the range from 30 to 99% by weight, more preferably in the range from 40 to 97% by weight and even more preferably in the range from 50 to 95% by weight.

Preferably, the proportion of all mono-, di- or multireactive liquid-crystalline compounds, preferably selected from the compounds of the formulae DRM, MRM and their subformulae as given above and below in the polymerisable LC medium according to the present invention as a whole, is in the range from 30 to 99.9% by weight, more preferably in the range from 40 to 99.9% by weight and even more preferably in the range from 50 to 99.9% by weight. In a preferred embodiment, the proportion of di- or multireactive polymerisable mesogenic compounds in the polymerisable LC medium according to the present invention as a whole, is in the range from 5 to 99% by weight, more preferably from 10 to 97% by weight and even more preferably from 15 to 95% by weight.

In another preferred embodiment, the proportion of monoreactive polymerisable mesogenic compounds in a polymerisable LC medium according to the present invention as a whole, is in the range from 5 to 80% by weight, more preferably from 10 to 75% by weight and even more preferably from 15 to 70% by weight.

In another preferred embodiment, the proportion of multireactive polymerisable mesogenic compounds in a polymerisable LC medium according to the present invention as a whole is in the range from 1 to 30% by weight, more preferably from 2 to 20% by weight and even more preferably from 3 to 10% by weight.

In another preferred embodiment, the proportion of di- or multireactive polymerisable mesogenic compounds in a polymerisable LC medium according to the present invention as a whole is in the range from 25 to 65% by weight, more preferably from 30 to 60% by weight, and the proportion of monoreactive polymerisable mesogenic compounds in a polymerisable LC medium according to the present invention as a whole is in the range from 30 to 75% by weight, more preferably from 40 to 70% by weight.

In another preferred embodiment the polymerisable LC medium does not contain polymerisable mesogenic compounds having more than one polymerisable group.

In another preferred embodiment the polymerisable LC medium does not contain polymerisable mesogenic compounds having more than two polymerisable groups.

In another preferred embodiment the polymerisable LC medium does not contain polymerisable mesogenic compounds having less than two polymerisable groups.

The compounds of the formulae DRM, MRM and their subformulae can be pre-pared analogously to processes known to the person skilled in the art and described in standard works of organic chemistry, such as, for example, in Houben-Weyl, Methoden der organischen Chemie [Methods of Organic Chemistry], Thieme-Verlag, Stuttgart.

In another preferred embodiment the polymerisable LC medium additionally contains one or more dyes or chromophores, preferably selected from dichroic dyes, which is especially suitable for preparing dichroic polarisers.

Suitable dichroic dyes are known to the skilled person and are described in the literature and/or commercially available. Preferred dichroic dyes are selected from the following formulae

D1

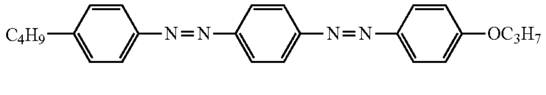

D2

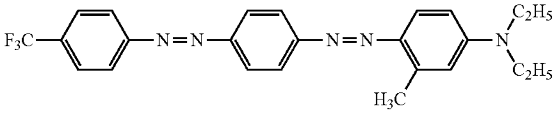

D3

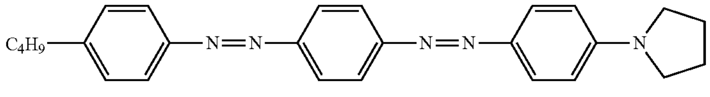

D4

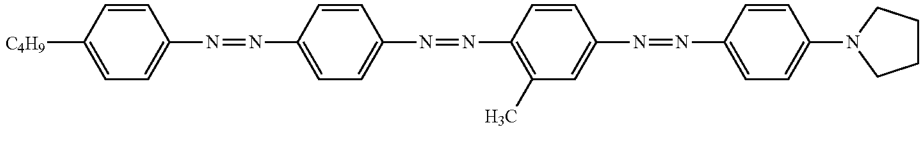

The dye D4 is for example commercially available under the name G205 (from Nippon Kankoh-Shikisho Kenkyusho Co., Ltd.).

Alternatively, one of the RMs may contain a dichroic chromophoric group.

The concentration of the dye(s) in the polymerisable LC medium is preferably from 0.1 to 10%, more preferably from 0.5 to 5%, most preferably from 0.5 to 3% by weight.

Preferably, the dichroic ratio N of a dichroic birefringent polymer film according to the present invention is at least 10, more preferably at least 15, very preferably at least 20

In a further preferred embodiment the polymerisable LC medium optionally comprises one or more additives selected from the group consisting of further polymerisation initiators, antioxidants, surfactants, stabilisers, catalysts, sensitizers, inhibitors, chain-transfer agents, co-reacting monomers, reactive thinners, surface-active compounds, lubricating agents, wetting agents, dispersing agents, hydrophobing agents, adhesive agents, flow improvers, degassing or defoaming agents, deaerators, diluents, reactive diluents, auxiliaries, colourants, dyes, pigments and nanoparticles.

In another preferred embodiment, the polymerisable LC medium optionally comprises one or more additives selected from polymerisable non-mesogenic compounds (reactive thinners). The amount of these additives in the polymerisable LC medium is preferably from 0 to 30%, very preferably from 0 to 25%.

The reactive thinners used are not only substances which are referred to in the actual sense as reactive thinners, but also auxiliary compounds already mentioned above which contain one or more complementary reactive units or polymerisable groups P, for example hydroxyl, thiol-, or amino groups, via which a reaction with the polymerisable units of the liquid-crystalline compounds can take place.

The substances, which are usually capable of photopolymerisation, include, for example, mono-, bi- and polyfunctional compounds containing at least one olefinic double bond. Examples thereof are vinyl esters of carboxylic acids, for example of lauric, myristic, palmitic and stearic acid, and of dicarboxylic acids, for example of succinic acid, adipic acid, allyl and vinyl ethers and methacrylic and acrylic esters of monofunctional alcohols, for example of lauryl, myristyl, palmityl and stearyl alcohol, and diallyl and divinyl ethers of bifunctional alcohols, for example ethylene glycol and 1,4-butanediol.

Also suitable are, for example, methacrylic and acrylic esters of polyfunctional alcohols, in particular those which contain no further functional groups, or at most ether groups, besides the hydroxyl groups. Examples of such alcohols are bifunctional alcohols, such as ethylene glycol, propylene glycol and their more highly condensed representatives, for example diethylene glycol, triethylene glycol, dipropylene glycol, tripropylene glycol etc., butanediol, pentanediol, hexanediol, neopentyl glycol, alkoxylated phenolic compounds, such as ethoxylated and propoxylated bisphenols, cyclohexanedimethanol, trifunctional and polyfunctional alcohols, such as glycerol, trimethylolpropane, butanetriol, trimethylolethane, pentaerythritol, ditrimethylolpropane, dipentaerythritol, sorbitol, mannitol, and the corresponding alkoxylated, in particular ethoxylated and propoxylated alcohols.

Other suitable reactive thinners are polyester (meth)acrylates, which are the (meth)acrylic ester of polyesterols.

Examples of suitable polyesterols are those which can be prepared by esterification of polycarboxylic acids, preferably dicarboxylic acids, using polyols, preferably diols. The starting materials for such hydroxyl-containing polyesters are known to the person skilled in the art. Dicarboxylic acids which can be employed are succinic, glutaric acid, adipic acid, sebacic acid, o-phthalic acid and isomers and hydrogenation products thereof, and esterifiable and transesterifiable derivatives of said acids, for example anhydrides and dialkyl esters. Suitable polyols are the abovementioned alcohols, preferably ethyleneglycol, 1,2- and 1,3-propylene glycol, 1,4-butanediol, 1,6-hexanediol, neopentyl glycol, cyclohexanedimethanol and polyglycols of the ethylene glycol and propylene glycol type.

Suitable reactive thinners are furthermore 1,4-divinylbenzene, triallyl cyanurate, acrylic esters of tricyclodecenyl alcohol also known under the name dihydrodicyclopentadienyl acrylate, and the allyl esters of acrylic acid, methacrylic acid and cyanoacrylic acid.

Of the reactive thinners, which are mentioned by way of example, those containing photopolymerisable groups are used in particular and in view of the abovementioned preferred compositions.

This group includes, for example, dihydric and polyhydric alcohols, for example ethylene glycol, propylene glycol and more highly condensed representatives thereof, for example diethylene glycol, triethylene glycol, dipropylene glycol, tripropylene glycol etc., butanediol, pentanediol, hexanediol, neopentyl glycol, cyclohexanedimethanol, glycerol, trimethylolpropane, butanetriol, trimethylolethane, pentaerythritol, ditrimethylolpropane, dipentaerythritol, sorbitol, mannitol and the corresponding alkoxylated, in particular ethoxylated and propoxylated alcohols.

The group furthermore also includes, for example, alkoxylated phenolic compounds, for example ethoxylated and propoxylated bisphenols.

These reactive thinners may furthermore be, for example, epoxide or urethane (meth)acrylates.

Epoxide (meth)acrylates are, for example, those as obtainable by the reaction, known to the person skilled in the art, of epoxidized olefins or poly- or diglycidyl ether, such as bisphenol A diglycidyl ether, with (meth)acrylic acid.

Urethane (meth)acrylates are, in particular, the products of a reaction, likewise known to the person skilled in the art, of hydroxylalkyl (meth)acrylates with poly- or diisocyanates.

Such epoxide and urethane (meth)acrylates are included amongst the compounds listed above as “mixed forms”.

If reactive thinners are used, their amount and properties must be matched to the respective conditions in such a way that, on the one hand, a satisfactory desired effect, for example the desired colour of the composition according to the invention, is achieved, but, on the other hand, the phase behaviour of the liquid-crystalline composition is not excessively impaired. The low-crosslinking (high-crosslinking) liquid-crystalline compositions can be prepared, for example, using corresponding reactive thinners, which have a relatively low (high) number of reactive units per molecule.

The group of diluents include, for example:

C1-C4-alcohols, for example methanol, ethanol, n-propanol, isopropanol, butanol, isobutanol, sec-butanol and, in particular, the C5-C12-alcohols n-pentanol, n-hexanol, n-heptanol, n-octanol, n-nonanol, n-decanol, n-undecanol and n-dodecanol, and isomers thereof, glycols, for example 1,2-ethylene glycol, 1,2- and 1,3-propylene glycol, 1,2-, 2,3- and 1,4-butylene glycol, di- and triethylene glycol and di- and tripropylene glycol, ethers, for example methyl tert-butyl ether, 1,2-ethylene glycol mono- and dimethyl ether, 1,2-ethylene glycol mono- and -diethylether, 3-methoxypropanol, 3-isopropoxypropanol, tetrahydrofuran and dioxane, ketones, for example acetone, methyl ethyl ketone, methyl isobutyl ketone and diacetone alcohol (4-hydroxy-4-methyl-2-pentanone), C1-C5-alkyl esters, for example methyl acetate, ethyl acetate, propyl acetate, butyl acetate and amyl acetate, aliphatic and aromatic hydrocarbons, for example pentane, hexane, heptane, octane, isooctane, petroleum ether, toluene, xylene, ethylbenzene, tetralin, decalin, dimethylnaphthalene, white spirit, Shellsok® and Solvesso® mineral oils, for example gasoline, kerosine, diesel oil and heating oil, but also natural oils, for example olive oil, soya oil, rapeseed oil, linseed oil and sunflower oil.

It is of course also possible to use mixtures of these diluents in the compositions according to the invention.

So long as there is at least partial miscibility, these diluents can also be mixed with water. Examples of suitable diluents here are C1-C4-alcohols, for example methanol, ethanol, n-propanol, isopropanol, butanol, isobutanol and sec-butanol, glycols, for example 1,2-ethylene glycol, 1,2- and 1,3-propylene glycol, 1,2-, 2,3- and 1,4-butylene glycol, di- and triethylene glycol, and di- and tripropylene glycol, ethers, for example tetrahydrofuran and dioxane, ketones, for example acetone, methyl ethyl ketone and diacetone alcohol (4-hydroxy-4-methyl-2-pentanone), and C1-C4-alkyl esters, for example methyl, ethyl, propyl and butyl acetate.

The diluents are optionally employed in a proportion of from about 0 to 10.0% by weight, preferably from about 0 to 5.0% by weight, based on the total weight of the polymerisable LC medium.

The antifoams and deaerators (c1)), lubricants and flow auxiliaries (c2)), thermally curing or radiation-curing auxiliaries (c3)), substrate wetting auxiliaries (c4)), wetting and dispersion auxiliaries (c5)), hydrophobicizing agents (c6)), adhesion promoters (c7)) and auxiliaries for promoting scratch resistance (c8)) cannot strictly be delimited from one another in their action.

For example, lubricants and flow auxiliaries often also act as antifoams and/or deaerators and/or as auxiliaries for improving scratch resistance. Radiation-curing auxiliaries can also act as lubricants and flow auxiliaries and/or deaerators and/or as substrate wetting auxiliaries. In individual cases, some of these auxiliaries can also fulfil the function of an adhesion promoter (c8)).

Corresponding to the above-said, a certain additive can therefore be classified in a number of the groups c1) to c8) described below.

The antifoams in group c1) include silicon-free and silicon-containing polymers. The silicon-containing polymers are, for example, unmodified or modified polydialkylsiloxanes or branched copolymers, comb or block copolymers comprising polydialkylsiloxane and polyether units, the latter being obtainable from ethylene oxide or propylene oxide.

The deaerators in group c1) include, for example, organic polymers, for example polyethers and polyacrylates, dialkylpolysiloxanes, in particular dimethylpolysiloxanes, organically modified polysiloxanes, for example arylalkyl-modified polysiloxanes, and fluorosilicones.

The action of the antifoams is essentially based on preventing foam formation or destroying foam that has already formed. Antifoams essentially work by promoting coalescence of finely divided gas or air bubbles to give larger bubbles in the medium to be deaerated, for example the compositions according to the invention, and thus accelerate escape of the gas (of the air). Since antifoams can frequently also be employed as deaerators and vice versa, these additives have been included together under group c1).

Such auxiliaries are, for example, commercially available from Tego as TEGO® Foamex 800, TEGO® Foamex 805, TEGO® Foamex 810, TEGO® Foamex 815, TEGO® Foamex 825, TEGO® Foamex 835, TEGO® Foamex 840, TEGO® Foamex 842, TEGO® Foamex 1435, TEGO® Foamex 1488, TEGO® Foamex 1495, TEGO® Foamex 3062, TEGO® Foamex 7447, TEGO® Foamex 8020, Tego® Foamex N, TEGOR Foamex K 3, TEGOR Antifoam 2-18, TEGOR Antifoam 2-18, TEGOR Antifoam 2-57, TEGOR Antifoam 2-80, TEGOR Antifoam 2-82, TEGOR Antifoam 2-89, TEGOR Antifoam 2-92, TEGOR Antifoam 14, TEGOR Antifoam 28, TEGOR Antifoam 81, TEGOR Antifoam D 90, TEGOR Antifoam 93, TEGOR Antifoam 200, TEGOR Antifoam 201, TEGOR Antifoam 202, TEGOR Antifoam 793, TEGOR Antifoam 1488, TEGOR Antifoam 3062, TEGOPREN® 5803, TEGOPREN® 5852, TEGOPREN® 5863, TEGOPREN® 7008, TEGO® Antifoam 1-60, TEGOR Antifoam 1-62, TEGOR Antifoam 1-85, TEGO® Antifoam 2-67, TEGO® Antifoam WM 20, TEGOR Antifoam 50, TEGOR Antifoam 105, TEGOR Antifoam 730, TEGO® Antifoam MR 1015, TEGOR Antifoam MR 1016, TEGOR Antifoam 1435, TEGOR Antifoam N, TEGOR Antifoam KS 6, TEGOR Antifoam KS 10, TEGOR Antifoam KS 53, TEGOR Antifoam KS 95, TEGOR Antifoam KS 100, TEGOR Antifoam KE 600, TEGOR Antifoam KS 911, TEGO® Antifoam MR 1000, TEGOR Antifoam KS 1100, Tego® Airex 900, Tego® Airex 910, Tego® Airex 931, Tego® Airex 935, Tego® Airex 936, Tego® Airex 960, Tego® Airex 970, Tego® Airex 980 and Tego® Airex 985 and from BYK as BYK®-011, BYK®-019, BYK®-020, BYK®-021, BYK®-022, BYK®-023, BYK®-024, BYK®-025, BYK®-027, BYK®-031, BYK®-032, BYK®-033, BYK®-034, BYK®-035, BYK®-036, BYK®-037, BYK®-045, BYK®-051, BYK®-052, BYK®-053, BYK® 055, BYK®-057, BYK®-065, BYK®-066, BYK®-070, BYK®-080, BYK®-088, BYK®-141 and BYK®-A 530.

The auxiliaries in group c1) are optionally employed in a proportion of from about 0 to 3.0% by weight, preferably from about 0 to 2.0% by weight, based on the total weight of the polymerisable LC medium.

In group c2), the lubricants and flow auxiliaries typically include silicon-free, but also silicon-containing polymers, for example polyacrylates or modifiers, low-molecular-weight polydialkylsiloxanes. The modification consists in some of the alkyl groups having been replaced by a wide variety of organic radicals. These organic radicals are, for example, polyethers, polyesters or even long-chain (fluorinated)alkyl radicals, the former being used the most frequently.

The polyether radicals in the correspondingly modified polysiloxanes are usually built up from ethylene oxide and/or propylene oxide units. Generally, the higher the proportion of these alkylene oxide units in the modified polysiloxane, the more hydrophilic is the resultant product.

Such auxiliaries are, for example, commercially available from Tego as TEGO® Glide 100, TEGO® Glide ZG 400, TEGO® Glide 406, TEGO® Glide 410, TEGO® Glide 411, TEGO® Glide 415, TEGO® Glide 420, TEGO® Glide 435, TEGO® Glide 440, TEGO® Glide 450, TEGO® Glide A 115, TEGO® Glide B 1484 (can also be used as antifoam and deaerator), TEGO® Flow ATF, TEGO® Flow 300, TEGO® Flow 460, TEGO® Flow 425 and TEGO® Flow ZFS 460. Suitable radiation-curable lubricants and flow auxiliaries, which can also be used to improve the scratch resistance, are the products TEGO® Rad 2100, TEGO® Rad 2200, TEGO® Rad 2500, TEGO® Rad 2600 and TEGO® Rad 2700, which are likewise obtainable from TEGO.

Such-auxiliaries are also available, for example, from BYK as BYK®-300 BYK®-306, BYK®-307, BYK®-310, BYK®-320, BYK®-333, BYK®-341, Byk® 354, Byk®361, Byk®361N, BYK®388.

Such-auxiliaries are also available, for example, from 3M as FC4430®.

Such-auxiliaries are also available, for example, from Cytonix as FluorN®561 or FluorN®562.

Such-auxiliaries are also available, for example, from Merck KGaA as Tivida® FL 2300 and Tivida® FL 2500

The auxiliaries in group c2) are optionally employed in a proportion of from about 0 to 3.0% by weight, preferably from about 0 to 2.0% by weight, based on the total weight of the polymerisable LC medium.

In group c3), the radiation-curing auxiliaries include, in particular, polysiloxanes having terminal double bonds which are, for example, a constituent of an acrylate group. Such auxiliaries can be crosslinked by actinic or, for example, electron radiation. These auxiliaries generally combine a number of properties together. In the uncross-linked state, they can act as antifoams, deaerators, lubricants and flow auxiliaries and/or substrate wetting auxiliaries, while, in the crosslinked state, they increase, in particular, the scratch resistance, for example of coatings or films which can be produced using the compositions according to the invention. The improvement in the gloss properties, for example of precisely those coatings or films, is regarded essentially as a consequence of the action of these auxiliaries as antifoams, deaerators and/or lubricants and flow auxiliaries (in the uncrosslinked state).

Examples of suitable radiation-curing auxiliaries are the products TEGO® Rad 2100, TEGO® Rad 2200, TEGO® Rad 2500, TEGO® Rad 2600 and TEGO® Rad 2700 available from TEGO and the product BYK®-371 available from BYK.

Thermally curing auxiliaries in group c3) contain, for example, primary OH groups, which are able to react with isocyanate groups, for example of the binder.

Examples of thermally curing auxiliaries, which can be used, are the products BYK®-370, BYK®-373 and BYK®-375 available from BYK.

The auxiliaries in group c3) are optionally employed in a proportion of from about 0 to 5.0% by weight, preferably from about 0 to 3.0% by weight, based on the total weight of the polymerisable LC medium.

The substrate wetting auxiliaries in group c4) serve, in particular, to increase the wettability of the substrate to be printed or coated, for example, by printing inks or coating compositions, for example compositions according to the invention. The generally attendant improvement in the lubricant and flow behaviour of such printing inks or coating compositions has an effect on the appearance of the finished (for example crosslinked) print or coating.

A wide variety of such auxiliaries are commercially available, for example from Tego as TEGO® Wet KL 245, TEGO® Wet 250, TEGO® Wet 260 and TEGO® Wet ZFS 453 and from BYK as BYK®-306, BYK®-307, BYK®-310, BYK®-333, BYK®-344, BYK®-345, BYK®-346 and Byk®-348.

The auxiliaries in group c4) are optionally employed in a proportion of from about 0 to 3.0% by weight, preferably from about 0 to 1.5% by weight, based on the total weight of the liquid-crystalline composition.

The wetting and dispersion auxiliaries in group c5) serve, in particular, to prevent the flooding and floating and the sedimentation of pigments and are therefore, if necessary, suitable in particular in pigmented compositions.

These auxiliaries stabilize pigment dispersions essentially through electrostatic repulsion and/or steric hindrance of the pigment particles containing these additives, where, in the latter case, the interaction of the auxiliary with the ambient medium (for example binder) plays a major role.

Since the use of such wetting and dispersion auxiliaries is common practice, for example in the technical area of printing inks and paints, the selection of a suitable auxiliary of this type generally does not present the person skilled in the art with any difficulties, if they are used.

Such wetting and dispersion auxiliaries are commercially available, for example from Tego, as TEGO® Dispers 610, TEGO® Dispers 610 S, TEGO® Dispers 630, TEGO® Dispers 700, TEGO® Dispers 705, TEGO® Dispers 710, TEGO® Dispers 720 W, TEGO® Dispers 725 W, TEGO® Dispers 730 W, TEGO® Dispers 735 W and TEGO® Dispers 740 W and from BYK as Disperbyk®, Disperbyk®-107, Disperbyk®-108, Disperbyk®-110, Disperbyk®-111, Disperbyk® 115, Disperbyk®-130, Disperbyk®-160, Disperbyk®-161, Disperbyk®-162, Disperbyk®-163, Disperbyk®-164, Disperbyk®-165, Disperbyk®-166, Disperbyk®-167, Disperbyk®-170, Disperbyk®-174, Disperbyk®-180, Disperbyk®-181, Disperbyk®-182, Disperbyk®-183, Disperbyk®-184, Disperbyk®-185, Disperbyk®-190, Anti-Terra®-U, Anti-Terra®—U 80, Anti-Terra®—P, Anti-Terra®-203, Anti-Terra®-204, Anti-Terra®-206, BYK®-151, BYK®-154, BYK® 155, BYK®—P 104 S, BYK®—P 105, Lactimon®, Lactimon®—WS and Bykumen®.

The amount of the auxiliaries in group c5) used on the mean molecular weight of the auxiliary. In any case, a preliminary experiment is therefore advisable, but this can be accomplished simply by the person skilled in the art.

The hydrophobicizing agents in group c6) can be used to give water-repellent properties to prints or coatings produced, for example, using compositions according to the invention. This prevents or at least greatly suppresses swelling due to water absorption and thus a change in, for example, the optical properties of such prints or coatings. In addition, when the composition is used, for example, as a printing ink in offset printing, water absorption can thereby be prevented or at least greatly reduced.

Such hydrophobicizing agents are commercially available, for example, from Tego as Tego® Phobe WF, Tego® Phobe 1000, Tego® Phobe 1000 S, Tego® Phobe 1010, Tego® Phobe 1030, Tego® Phobe 1010, Tego® Phobe 1010, Tego® Phobe 1030, Tego® Phobe 1040, Tego® Phobe 1050, Tego® Phobe 1200, Tego® Phobe 1300, Tego® Phobe 1310 and Tego® Phobe 1400.

The auxiliaries in group c6) are optionally employed in a proportion of from about 0 to 5.0% by weight, preferably from about 0 to 3.0% by weight, based on the total weight of the polymerisable LC medium.

Further adhesion promoters from group c7) serve to improve the adhesion of two interfaces in contact. It is directly evident from this that essentially the only fraction of the adhesion promoter that is effective is that located at one or the other or at both interfaces. If, for example, it is desired to apply liquid or pasty printing inks, coating compositions or paints to a solid substrate, this generally means that the adhesion promoter must be added directly to the latter or the substrate must be pre-treated with the adhesion promoters (also known as priming), i.e. this substrate is given modified chemical and/or physical surface properties.

If the substrate has previously been primed with a primer, this means that the interfaces in contact are that of the primer on the one hand and of the printing ink or coating composition or paint on the other hand. In this case, not only the adhesion properties between the substrate and the primer, but also between the substrate and the printing ink or coating composition or paint play a part in adhesion of the overall multilayer structure on the substrate.

Adhesion promoters in the broader sense which may be mentioned are also the substrate wetting auxiliaries already listed under group c4), but these generally do not have the same adhesion promotion capacity.

In view of the widely varying physical and chemical natures of substrates and of printing inks, coating compositions and paints intended, for example, for their printing or coating, the multiplicity of adhesion promoter systems is not surprising.

Adhesion promoters based on silanes are, for example, 3-aminopropyltrimethoxysilane, 3-aminopropyltriethoxysilane, 3-aminopropylmethyldiethoxysilane, N-aminoethyl-3-aminopropyltrimethoxysilane, N-aminoethyl-3-aminopropylmethyldimethoxysilane, N-methyl-3-aminopropyltrimethoxysilane, 3-ureidopropyltriethoxysilane, 3-methacryloyloxypropyltrimethoxysilane, 3-glycidyloxypropyltrimethoxysilane, 3-mercaptopropyltrimethoxysilane, 3-chloropropyltrimethoxysilane and vinyltrimethoxysilane. These and other silanes are commercially available from Hüls, for example under the tradename DYNASILAN®.

Corresponding technical information from the manufacturers of such additives should generally be used or the person skilled in the art can obtain this information in a simple manner through corresponding preliminary experiments.

However, if these additives are to be added as auxiliaries from group c7) to the polymerisable LC mediums according to the invention, their proportion optionally corresponds to from about 0 to 5.0% by weight, based on the total weight of the polymerisable LC medium. These concentration data serve merely as guidance, since the amount and identity of the additive are determined in each individual case by the nature of the substrate and of the printing/coating composition. Corresponding technical information is usually available from the manufacturers of such additives for this case or can be determined in a simple manner by the person skilled in the art through corresponding preliminary experiments.

The auxiliaries for improving the scratch resistance in group c8) include, for example, the abovementioned products TEGO® Rad 2100, TEGO® Rad 2200, TEGO® Rad 2500, TEGO® Rad 2600 and TEGO® Rad 2700, which are available from Tego.

For these auxiliaries, the amount data given for group c3) are likewise suitable, i.e. these additives are optionally employed in a proportion of from about 0 to 5.0% by weight, preferably from about 0 to 3.0% by weight, based on the total weight of the liquid-crystalline composition.

Examples that may be mentioned of further light, heat and/or oxidation stabilizers are the following:

alkylated monophenols, such as 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which have a linear or branched side chain, for example 2,6-dinonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures of these compounds, alkylthiomethylphenols, such as 2,4-dioctylthiomethyl-6-tert-butylphenol, 2,4-dioctylthiomethyl-6-methylphenol, 2,4-dioctylthiomethyl-6-ethylphenol and 2,6-didodecylthiomethyl-4-nonylphenol, Hydroquinones and alkylated hydroquinones, such as 2,6-di-tert-butyl-4-methoxyphenol, 2,5-di-tert-butylhydroquinone, 2,5-di-tert-amylhydrocrainone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate and bis(3,5-di-tert-butyl-4-hydroxyphenyl)adipate, Tocopherols, such as α-tocopherol, β-tocopherol, y-tocopherol, o-tocopherol and mixtures of these compounds, and tocopherol derivatives, such as tocopheryl acetate, succinate, nicotinate and polyoxyethylenesuccinate ("tocofersolate"), hydroxylated diphenyl thioethers, such as 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol) and 4,4'-bis(2,6-dimethyl-4-hydroxyphenyl)disulfide, Alkylidenebisphenols, such as 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl) butane, 1,1-bis(5-tert-butyl-4-hydroxy-2-methylphenyl)-3-n-dodecyl-mercaptobutane, ethylene glycol bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl]terephthalate, 1,1-bis(3,5-dimethyl-2-hydroxyphenyl)butane, 2,2-bis (3,5-di-tert-butyl-4-hydroxyphenyl)propane, 2,2-bis(5-tert-butyl-4-hydroxy-2-methylphenyl)-4-n-dodecylmercaptobutane and 1,1,5,5-tetrakis(5-tert-butyl-4-hydroxy-2-methylphenyl)pentane, O—, N- and S-benzyl compounds, such as 3,5,3',5'-tetra-tert-butyl-4,4'-dihydroxydibenzyl ether, octadecyl 4-hydroxy-3,5-dimethylbenzylmercaptoacetate, tridecyl 4-hydroxy-3,5-di-tert-butylbenzylmercaptoacetate, tris(3,5-di-tert-butyl-4-hydroxybenzyl)amine, bis (4-tert-butyl-3-hydroxy-2,6-dimethylbenzyl)dithioterephthalate, bis(3,5-di-tert-butyl-4-hydroxybenzyl) sulfide and isooctyl-3,5-di-tert-butyl-4-hydroxybenzylmercaptoacetate, aromatic hydroxybenzyl compounds, such as 1,3,5-tris(3,5-di-tert-butyl-4-hydroxybenzyl)-2,4,6-trimethyl-benzene, 1,4-bis(3,5-di-tert-butyl-4-hydroxybenzyl)-2,3,5,6-tetramethyl-benzene and 2,4,6-tris(3,5-di-tert-butyl-4-hydroxybenzyl)phenol, Triazine compounds, such as 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris-(3,5-di-tert-butyl-4-hydroxyphenylpropionyl)hexahydro-1,3,5-triazine, 1,3,5-tris(3,5-dicyclohexyl-4-hydroxybenzyl)isocyanurate and 1,3,5-tris(2-hydroxyethyl)isocyanurate, Benzylphosphonates, such as dimethyl 2,5-di-tert-butyl-4-hydroxybenzylphosphonate, diethyl 3,5-di-tert-butyl-4-hydroxybenzylphosphonate, dioctadecyl 3,5-di-tert-butyl-4-hydroxybenzylphosphonate and dioctadecyl 5-tert-butyl-4-hydroxy-3-methylbenzylphosphonate, Acylaminophenols, such as 4-hydroxylauroylanilide, 4-hydroxystearoylanilide and octyl N-(3,5-di-tert-butyl-4-hydroxyphenyl)carbamate, Propionic and acetic esters, for example of monohydric or polyhydric alcohols, such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane and 4-hydroxymethyl-1-phospha-2,6,7-trioxabicyclo[2.2.2]-octane, Propionamides based on amine derivatives, such as N,N'-bis(3,5-di-tert-butyl-4-hydroxyphenylpropionyl) hexamethylenediamine, N,N'-bis(3,5-di-tert-butyl-4-hydroxyphenylpropionyl)trimethylenediamine and N,N'-bis(3,5-di-tert-butyl-4-hydroxyphenylpropionyl) hydrazine, Ascorbic acid (Vitamin C) and ascorbic acid derivatives, such as ascorbyl palmitate, laurate and stearate, and ascorbyl sulfate and phosphate, Antioxidants based on amine compounds, such as N,N'-diisopropyl-p-phenylenediamine, N, N'-di-sec-butyl-p-phenylenediamine, N,N'-bis(1,4-dimethylpentyl)-p-phenylenediamine, N, N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl) diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octyl-substituted diphenylamine, such as p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis[4-methoxyphenyl) amine, 2,6-di-tert-butyl-4-dimethylaminomethylphenol, 2,4-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis [4-(1',3'-dimethylbutyl)phenyl]amine, tert-octyl-substituted N-phenyl-1-naphthylamine, a mixture of mono- and dialkylated tert-butyl/tert-octyldiphenylamine, a mixture of mono- and dialkylated nonyldiphenylamine, a mixture of mono- and dialkylated dodecyldiphenylamine, a mixture of mono- and dialkylated isopropyl/isohexyldiphenylamine, a mixture of mono- and dialkylated tert-butyldiphenylamine, 2,3-dihydro-3,3-dimethyl-4H-1,4-benzothiazine, phenothiazine, a mixture of mono- and dialkylated tert-butyl/tert-octylphenothiazine, a mixture of mono- and dialkylated tert-octylphenothiazine, N-allylphenothiazine, N,N,N',N'-tetraphenyl-1,4-diaminobut-2-ene, N,N-bis(2,2,6,6-tetramethylpiperidin-4-yl)hexamethylenediamine, bis (2,2,6,6-tetramethylpiperidin-4-yl)sebacate, 2,2,6,6-tetramethylpiperidin-4-one and 2,2,6,6-tetramethylpiperidin-4-ol, Phosphines, phosphites and phosphonites, such as triphenylphosnine triphenylphosphite, diphenyl alkyl phosphite, phenyl dialkyl phosphite, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,6-di-tert-butyl-4-methylphenyl)pentaerythritol diphosphite, diisodecyloxy pentaerythritol diphosphite, bis(2,4-di-tert-butyl-6-methylphenyl)pentaerythritol diphosphite, bis(2,4,6-tris(tert-butylphenyl))pentaerythritol diphosphite, tristearyl sorbitol triphosphite, tetrakis(2,4-di-tert-butylphenyl)4,4'-biphenylenediphosphonite, 6-isooctyloxy-2,4,8,10-tetra-tert-butyl-12H-dibenz[d,g]-1,3,2-dioxaphosphocine, 6-fluoro-2,4,8,10-tetra-tert-butyl-12-methyl-dibenz[d,g]-1,3,2-dioxaphosphocine, bis(2,4-di-tert-butyl-6-methylphenyl)methyl phosphite and bis(2,4-di-tert-butyl-6-methylphenyl)ethyl phosphite, 2-(2'-Hydroxyphenyl)benzotriazoles, such as 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3,5'-bis-(α,α-dimethylbenzyl)-2'-hydroxyphenyl)benzotriazole, a mixture of 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxy phenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl) phenyl)benzotriazole, 2-(3'-tert-butyl-5'-[2-(2-ethylhexyloxy)carbonylethyl]-2'-hydroxy phenyl) benzotriazole, 2-(3'-dodecyl-2'-hydroxy-5'-methylphenyl)benzotriazole and 2-(3'-tert-butyl-2'-hydroxy-5'-(2-isooctyloxycarbonylethyl)phenyl benzotriazole, 2,2'-methylenebis[4-(1,1,3,3-tetramethylbutyl)-6-benzotriazol-2-ylphenol]; the product of complete esterification of 2-[3'-tert-butyl-5'-(2-methoxycarbonylethyl)-2'-hydroxyphenyl]-2H-benzotriazole with polyethylene glycol 300;

Sulfur-containing peroxide scavengers and sulfur-containing antioxidants, such as esters of 3,3'-thiodipropionic acid, for example the lauryl, stearyl, myristyl and tridecyl esters, mercaptobenzimidazole and the zinc salt of 2-mercaptobenzimidazole, dibutylzinc dithiocarbamates, dioctadecyl disulfide and pentaerythritol tetrakis(β-dodecylmercapto)propionate, 2-hydroxybenzophenones, such as the 4-hydroxy, 4-methoxy, 4-octyloxy, 4-decycloxy, 4-dodecyloxy, 4-benzyloxy, 4,2',4'-trihydroxy and 2'-hydroxy-4,4'-dimethoxy derivatives, Esters of unsubstituted and substituted benzoic acids, such as 4-tert-butylphenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl-3,5-di-tert-butyl-4-hydroxybenzoate, octadecyl-3,5-di-tert-butyl-4-hydroxybenzoate and 2-methyl-4,6-di-tert-butylphenyl-3,5-di-tert-butyl-4-hydroxybenzoate, Acrylates, such as ethyl α-cyano-β,β-diphenylacrylate, isooctyl α-cyano-β,β-diphenylacrylate, methyl α-methoxycarbonylcinnamate, methyl α-cyano-β-methyl-p-methoxycinnamate, butyl-α-cyano-β-methyl-p-methoxycinnamate and methyl-α-methoxycarbonyl-p-methoxycinnamate, sterically hindered amines, such as bis(2,2,6,6-tetramethylpiperidin-4-yl) sebacate, bis(2,2,6,6-tetramethylpiperidin-4-yl)succinate, bis(1,2,2,6,6-pentamethylpiperidin-4-yl)sebacate, bis(1-octyloxy-2,2,6,6-tetramethylpiperidin-4-yl)sebacate, bis(1,2,2,6,6-pentamethylpiperidin-4-yl)-n-butyl-3,5-di-tert-butyl-4-hydroxybenzylmalonate, the condensation product of 1-(2-hydroxyethyl)-2,2,6,6-tetramethyl-4-hydroxypiperidine and succinic acid, the condensation product of N,N'-bis(2,2,6,6-tetramethylpiperidin-4-yl)hexamethylenediamine and 4-tert-octylamino-2,6-dichloro-1,3,5-triazine, tris(2,2,6,6-tetramethylpiperidin-4-yl)nitrilotriacetate, tetrakis(2,2,6,6-tetramethylpiperidin-4-yl)1,2,3,4-butanetetracarboxylate, 1,1'-(1,2-ethylene)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidin-4-yl)2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidin-4-yl)sebacate, bis(1-octyloxy-2,2,6,6-tetramethylpiperidin-4-yl)succinate, the condensation product of N,N'-bis(2,2,6,6-tetramethylpiperidin-4-yl)hexamethylenediamine and 4-morpholino-2,6-dichloro-1,3,5-triazine, the condensation product of 2-chloro-4,6-bis(4-n-butylamino-2,2,6,6-tetramethylpiperidin-4-yl)-1,3,5-triazine and 1,2-bis(3-aminopropylamino)ethane, the condensation product of 2-chloro-4,6-di(4-n-butylamino-1,2,2,6,6-pentamethylpiperidin-4-yl)-1,3,5-triazine and 1,2-bis(3-aminopropylamino)ethane, 8-acetyl-3-dodecyl-7,7,9,9-tetramethyl-1,3,8-triazaspiro[4.5]-decane-2,4-dione, 3-dodecyl-1-(2,2,6,6-tetramethylpiperidin-4-yl)pyrrolidine-2,5-dione, 3-dodecyl-1-(1,2,2,6,6-pentamethylpiperidin-4-yl) pyrrolidine-2,5-dione, a mixture of 4-hexadecyloxy- and 4-stearyloxy-2,2,6,6-tetramethylpiperidine, the condensation product of N,N'-bis(2,2,6,6-tetramethylpiperidin-4-yl)hexamethylenediamine and 4-cyclohexylamino-2,6-dichloro-1,3,5-triazine, the condensation product of 1,2-bis(3-aminopropylamino)ethane and 2,4,6-trichloro-1,3,5-triazine, 4-butylamino-2,2,6,6-tetramethylpiperidine, N-(2,2,6,6-tetramethylpiperidin-4-yl)-n-dodecylsuccinimide, N-(1,2,2,6,6-pentamethylpiperidin-4-yl)-n-dodecylsuccinimide, 2-undecyl-7,7,9,9-tetramethyl-1-oxa-3,8-diaza-4-oxo-spiro[4.5]-decane, the condensation product of 7,7,9,9-tetramethyl-2-cycloundecyl-1-oxa-3,8-diaza-4-oxospiro-[4.5]decane and epichlorohydrin, the condensation products of 4-amino-2,2,6,6-tetramethylpiperidine with tetramethylolacetylenediureas and poly(methoxypropyl-3-oxy)-[4(2,2,6,6-tetramethyl)piperidinyl]-siloxane, Oxalamides, such as 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N, N'-bis(3-dimethylaminopropyl)oxalamide, 2-ethoxy-5-tert-butyl-2'-ethoxanilide and its mixture with 2-ethoxy-2'-ethyl-5,4'-di-tert-butoxanilide, and mixtures of ortho-, para-methoxy-disubstituted oxanilides and mixtures of ortho- and para-ethoxy-disubstituted oxanilides, and 2-(2-hydroxyphenyl)-1,3,5-triazines, such as 2,4,6-tris-(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropoxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis-(2,4-dimethylphenyl)-1,3,5-triazine, 2-(2-hydroxy-4-hexyloxyphenyl)-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine and 2-(2-hydroxyphenyl)-4-(4-methoxyphenyl)-6-phenyl-1,3,5-triazine.

In another preferred embodiment the polymerisable LC medium comprises one or more specific antioxidant additives, preferably selected from the Irganox® series, e.g. the commercially available antioxidants Irganox®1076 and Irganox®1010, from Ciba, Switzerland.

In another preferred embodiment, the polymerisable LC medium comprises one or more, more preferably two or more photoinitiators, for example, selected from the commercially available Irgacure® or Darocure® (Ciba AG) series, in particular, Irgacure 127, Irgacure 184, Irgacure 369, Irgacure 651, Irgacure 817, Irgacure 907, Irgacure 1300, Irgacure, Irgacure 2022, Irgacure 2100, Irgacure 2959, or Darcure TPO. Especially the polymerisable LC medium comprises preferably one or more oxime ester photoinitiators preferably selected from the commercially available OXE02 (Ciba AG), NCI 930, N1919T (Adeka), SPI-03 or SPI-04 (Samyang).

The concentration of the polymerisation initiator(s) as a whole in the polymerisable LC medium is preferably from 0.5 to 10%, very preferably from 0.8 to 8%, more preferably 1 to 6%.

Preferably, the polymerisable LC medium comprises a given ratio between the concentration of the photoinitiator and the concentration of all chiral compounds as a whole, which is in the range from 1:1 to 1:5, more preferably in the range from 1:1 to 1:4, even more preferably in the range from 1:1 to 1:3.

In a preferred embodiment the polymerisable LC medium is dissolved in a suitable solvent, which are preferably selected from organic solvents.

The solvents are preferably selected from ketones such as acetone, methyl ethyl ketone, methyl propyl ketone, methyl isobutyl ketone or cyclohexanone; acetates such as methyl, ethyl or butyl acetate or methyl acetoacetate; alcohols such as methanol, ethanol or isopropyl alcohol; aromatic solvents such as toluene or xylene; alicyclic hydrocarbons such as cyclopentane or cyclohexane; halogenated hydrocarbons such as di- or trichloromethane; glycols or their esters such as PGMEA (propyl glycol monomethyl ether acetate), y-butyrolactone. It is also possible to use binary, ternary or higher mixtures of the above solvents.

In case the polymerisable LC medium contains one or more solvents, the total concentration of all solids, including the RMs, in the solvent(s) is preferably from 10 to 60%.

Preferably, the polymerisable LC medium comprises, a) one or more di- or multireactive polymerisable mesogenic compounds,
b) optionally one or more monoreactive polymerisable mesogenic compounds, preferably selected from compounds of formula MRM1, MRM7, MRM9 and/or MRM10 and their corresponding subformulae,
c) one or more polymerisable oligomeric liquid crystal or mesogenic compounds, preferably selected from compounds of formula O, very preferably from formula O1,
d) optionally one or more dyes, preferably selected from dichroic dyes,
e) optionally one or more antioxidative additives,
f) optionally one or more adhesion promotors,
g) optionally one or more surfactants,
h) optionally one or more mono-, di- or multireactive polymerisable non-mesogenic compounds,
i) optionally one or more dyes showing an absorption maximum at the wavelength used to initiate photo polymerisation,
j) optionally one or more chain transfer agents,
k) optionally one or more further stabilizers,
l) optionally one or more lubricants and flow auxiliaries, and
m) optionally one or more diluents,
n) optionally a non-polymerisable nematic component,
o) optionally one or more organic solvents.

The polymerisable LC medium according to the present invention are prepared in a manner conventional per se, for example by mixing one or more of the above-mentioned photoreactive chiral compounds with one or more direactive LC compounds and one or more chiral compounds, as defined above, and optionally with further additives.

The invention further relates to a process of preparing a polymer film comprising, preferably consisting of the steps of

- providing a layer of a polymerisable LC medium as described above and below onto a substrate, which is optionally provided with an alignment layer capable of inducing a planar alignment to the adjacent layer of the polymerisable LC medium,
- heating the polymerisable LC medium to a temperature where it exhibits a nematic phase,
- cooling the polymerisable LC medium, or allowing it to cool, to a temperature where it exhibits a smectic phase, preferably a smectic B phase,
- irradiating the layer of the polymerisable LC medium with actinic radiation, preferably with UV radiation.

The invention further relates to a polymer film obtainable by this process.

Preferably in the process according to the present invention all irradiation or UV exposure steps are carried out at room temperature, and the layer of the polymerisable LC medium is not subjected to heat treatment during or between the irradiation or UV exposure steps.

This polymerisable LC medium can be coated or printed onto the substrate, for example by spin-coating, printing, or other known techniques, and the solvent is evaporated off before polymerisation. In most cases, it is suitable to heat the mixture in order to facilitate the evaporation of the solvent.

The polymerisable LC medium can be applied onto a substrate by conventional coating techniques like spin coating, bar coating or blade coating. It can also be applied to the substrate by conventional printing techniques which are known to the expert, like for example screen printing, offset printing, reel-to-reel printing, letter press printing, gravure printing, rotogravure printing, flexographic printing, intaglio printing, pad printing, heat-seal printing, ink-jet printing or printing by means of a stamp or printing plate.

Suitable substrate mediums and substrates are known to the expert and described in the literature, as for example conventional substrates used in the optical films industry, such as glass or plastic. Especially suitable and preferred substrates for polymerisation are polyester such as polyethyleneterephthalate (PET) or polyethylenenaphthalate (PEN), polyvinylalcohol (PVA), polycarbonate (PC), triacetylcellulose (TAC), cyclo-olefin polymers (COP), or commonly known color filter materials, preferably triacetylcellulose (TAC), cyclo-olefin polymers (COP), or commonly known colour filter materials.

The Friedel-Creagh-Kmetz rule can be used to predict whether a mixture will adopt planar or homeotropic alignment, by comparing the surface energies of the RM layer ($\gamma_{RM}$) and the substrate ($\gamma_s$):

If $\gamma_{RM}>\gamma_s$ the reactive mesogenic compounds will display homeotropic alignment, If $\gamma_{RM}<\gamma_s$ the reactive mesogenic compounds will display homogeneous alignment.

Without wishing to be bound to a specific theory, when the surface energy of a substrate is relatively low, the intermolecular forces between the reactive mesogens are stronger than the forces across the RM-substrate interface and consequently, reactive mesogens align perpendicular to the substrate (homeotropic alignment) in order to maximise the intermolecular forces. Accordingly, an additional alignment layer capable of inducing a planar alignment to the adjacent polymerisable LC medium is required.

When the surface tension of the substrate is greater than the surface tension of the RMs, the force across the interface dominates. The interface energy is minimised if the reactive mesogens align parallel with the substrate, so the long axis of the RM can interact with the substrate. One way planar alignment can be promoted is by coating the substrate with a polyimide layer, and then rubbing the alignment layer with a velvet cloth. Other suitable planar alignment layers are known in the art, like for example rubbed polyimide or alignment layers prepared by photoalignment as described in U.S. Pat. Nos. 5,602,661, 5,389,698 or 6,717,644.

In general, reviews of alignment techniques are given for example by I. Sage in "Thermotropic Liquid Crystals", edited by G. W. Gray, John Wiley & Sons, 1987, pages 75-77; and by T. Uchida and H. Seki in "Liquid Crystals—Applications and Uses Vol. 3", edited by B. Bahadur, World Scientific Publishing, Singapore 1992, pages 1-63. A further review of alignment materials and techniques is given by J. Cognard, Mol. Cryst. Liq. Cryst. 78, Supplement 1 (1981), pages 1-77.

In a preferred embodiment, the process according to the invention contains a process step where the polymerisable LC medium is allowed to rest for a period of time in order to evenly redistribute the polymerisable LC medium on the substrate (herein referred to as "annealing").

In a preferred embodiment, after providing the polymerisable LC medium onto the substrate, the layer stack is annealed for a time between 10 seconds and 1 hour, preferably between 20 seconds and 10 minutes and most preferably between 30 seconds and 2 minutes. The annealing is preferably performed at room temperature.

If necessary, the layer stack can be cooled down to room temperature after annealing at an elevated temperature. The cooling can be performed actively with the help of cooling aids or passively just by letting the layer stack rest for a given time.

Photopolymerisation of the polymerisable LC medium is preferably achieved by exposing it to actinic radiation. Actinic radiation means irradiation with light, like UV light, IR light or visible light, irradiation with X-rays or gamma rays, or irradiation with high-energy particles, such as ions or electrons. Preferably, polymerisation is carried out by photo irradiation, in particular with UV light. As a source for actinic radiation, for example a single UV lamp or a set of UV lamps can be used. When using a high lamp power the curing time can be reduced. Another possible source for photo radiation is a laser, like e.g. a UV laser, an IR laser, or a visible laser.

The curing time for the photopolymerisation is dependent, inter alia, on the reactivity of the polymerisable LC medium, the thickness of the coated layer, the type of polymerisation initiator and the power of the UV lamp. The curing time is preferably ≤5 minutes, very preferably ≤3 minutes, most preferably ≤1 minute. For mass production, short curing times of ≤30 seconds are preferred.

A suitable UV radiation power for the photopolymerisation is preferably in the range from 100 to 1000 mWcm−2, more preferably in the range from 200 to 800 $mWcm^{-2}$ and most preferably in the range from 300 to 600 $mWcm^{-2}$.

In connection with the applied UV radiation and as a function of time, a suitable UV dose is preferably in the range from 25 to 16500 $mJcm^{-2}$, more preferably in the range from 50 to 7200 $mJcm^{-2}$, very preferably in the range from 100 to 3500 $mJcm^{-2}$ and most preferably in the range from 200 to 2000 $mJcm^{-2}$.

Photopolymerisation is preferably performed under an inert gas atmosphere, preferably in a nitrogen atmosphere.

Photopolymerisation is preferably performed at room temperature.

The preferred thickness of a polymerised LC film according to the present invention is determined by the optical properties desired from the film or the final product.

For optical applications of the polymer film, it preferably has a thickness of from 0.5 to 10 μm, very preferably from 0.5 to 5 μm, in particular from 0.5 to 3 μm.

After photopolymerisation, the resulting polymer film can be removed from the substrate and combined with other substrates or optical films by a laminating process known by the skilled person. Suitable substrates and optical films are given above and include especially polarisers, in particular linear polarisers.

In summary, the polymerised LC films and polymerisable LC mediums according to the present invention are useful for optical components or elements.

The polymerised LC films and polymerisable LC mediums according to the present invention can be used in displays of the transmissive or reflective type, especially they can be used in conventional OLED displays or LCDs, in particular OLED displays.

The present invention is described above and below with particular reference to the preferred embodiments. It should be understood that various changes and modifications might be made therein without departing from the spirit and scope of the invention.

Many of the compounds or mixtures thereof mentioned above and below are commercially available. All of these compounds are either known or can be prepared by methods which are known per se, as described in the literature (for example in the standard works such as Houben-Weyl, Methoden der Organischen Chemie [Methods of Organic Chemistry], Georg-Thieme-Verlag, Stuttgart), to be precise under reaction conditions which are known and suitable for said reactions. Use may also be made here of variants which are known per se, but are not mentioned here.

It will be appreciated that variations to the foregoing embodiments of the invention can be made while still falling within the scope of the invention. Alternative features serving the same, equivalent, or similar purpose may replace each feature disclosed in this specification, unless stated otherwise. Thus, unless stated otherwise, each feature disclosed is one example only of a generic series of equivalent or similar features.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

It will be appreciated that many of the features described above, particularly of the preferred embodiments, are inventive in their own right and not just as part of an embodiment of the present invention. Independent protection may be sought for these features in addition to or alternative to any invention presently claimed.

The invention will now be described in more detail by reference to the following working examples, which are illustrative only and do not limit the scope of the invention.

EXAMPLE 1

The oligomer O1 is prepared as follows:

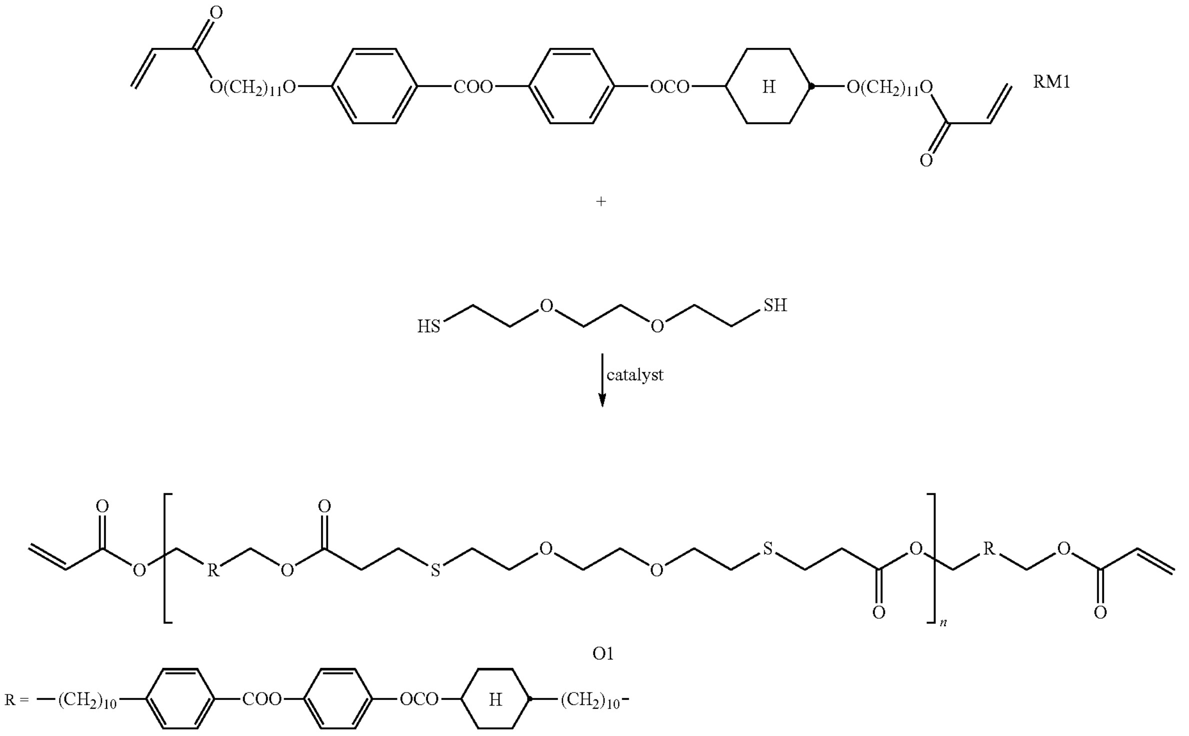

RM1

O1 wherein n is given by the average molecular weights shown in Table 1.

The smectic reactive mesogen RM1 (Cr 46 SB 98 SA 112 N 114 I) is stirred with 2,2' (ethylenedioxy)diethanediol (DODT) in the presence of the catalyst 1,8-diazabicyclo [5.4.0]undec-7-ene (3 drops) in dichloromethane (20 mL) for 18 h at 38° C. The reaction mixture is washed sequentially with 0.1M HCl solution, distilled water, and brine. The organic phase is dried ($MgSO_4$), and the solvent removed under reduced pressure. The residue is dried under high vacuum at 40° C. for 1 day to yield the desired product at high yields (>95%). Two samples with different ratio RM1/DODT are prepared as shown in Table 1.

TABLE 1

| Name | Ratio RM1/DODT | RM1 [mmol] | DODT [mmol] | Mn [g/mol] | PDI | n |
|---|---|---|---|---|---|---|
| O1A | 0.96 | 0.64 | 0.67 | 5911 | 6.86 | ~5 |
| O1B | 1.6 | 0.64 | 0.40 | 2585 | 3.19 | ~2 |

Mn is estimated through $^1$H-NMR analysis and the PDI is determined by gel permeation chromatography (GPC), with tetrahydrofuran (THF) as eluent versus polystyrene standards.

The oligomers show the following LC phase sequences:

O1A: Cr 15.3 SmX 74.4 I

O1B: Cr 7.7 SmX 94.4 I wherein the SmX phase is an unidentified smectic phase.

The polymerisable mixture RMM1 is formulated as follows:

| RMM 1 Compound | Conc.in % w/w |
|---|---|
| 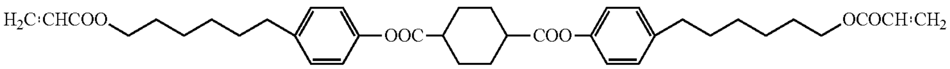 RM-A | 38.78 |
| 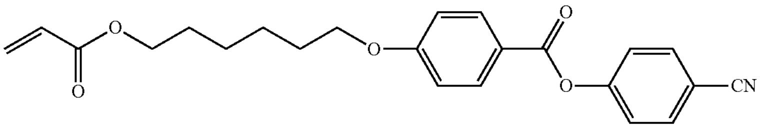 RM-B | 19.30 |

-continued

| RMM 1 Compound | Conc. in % w/w |
|---|---|
| 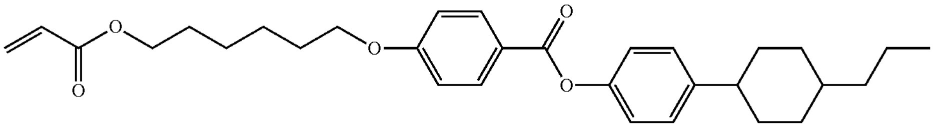 RM-C | 38.78 |
| N1919T (Photoinitiator) | 2.04 |
| BYK ®-310 (Surfactant) | 1.02 |
| Irganox ®1076 (Stabilizer) | 0.08 |

Irganox®1076 is a stabilizer, being commercially available (Ciba AG, Basel, Switzerland). N1919T® is a photoinitiator, being commercially available (Adeka Corporation, Japan). BYK®-310 is a surfactant being commercially available (BYK, Germany).

The mixture RMM1 shows the LC phase sequence Cr 60 SmA 75 N 113 I.

30% of the oligomer O1B are added to the mixture RMM1 to form polymerisable mixture SRMM1.

The mixture SRMM1 shows the following LC phase sequence: Cr 20.6 SmA 56.3 N 95.5 I A solution of mixture SRMM1 in toluene (25 wt. % solid content) is spincoated onto a glass substrate comprising a polyimide alignment layer. After the solvent is evaporated off a continuous film of the coated mixture SRMM1 is formed.

The coated film of SRMM1 is annealed at 100° C. and then cooled down to RT, thereby converting the mixture from the nematic phase to the smectic A phase. The smectic A alignment is stable and can be observed even after storing the coated film prior to polymerisation.

The coated film of the mixture SRMM1 is polymerised by UV exposure to a UV-LED lamp (365 nm, 10 mW/$cm^2$) for 1 h at 30° C. to form a polymer film with a thickness of 4.2 μm wherein the smectic A alignment is permanently fixed.

2% of the dichroic diazo dye G205 (Hayashibara Biochemical Laboratories INC, Kankoh-Shikiso Institute, Okayama, Japan) are added to the mixture SRMM1 and a polymer film with a thickness of 5.2 μm is prepared as described above. The polymer film has a dichroic ratio of 9.1, determined from absorption measurements in accordance with equation (1) above. The polymer film is thus suitable as dichroic ultra-thin polariser (UTP).

COMPARISON EXAMPLE 1

For comparison purposes, a solution of the mixture RMM1 without the oligomer is spincoated on a glass substrate as described in Example 3.1. After evaporation of the solvent dewetting occurs and liquid droplets of the mixture are being formed instead of a continuous film.

EXAMPLE 2

The oligomer O2 is prepared as follows:

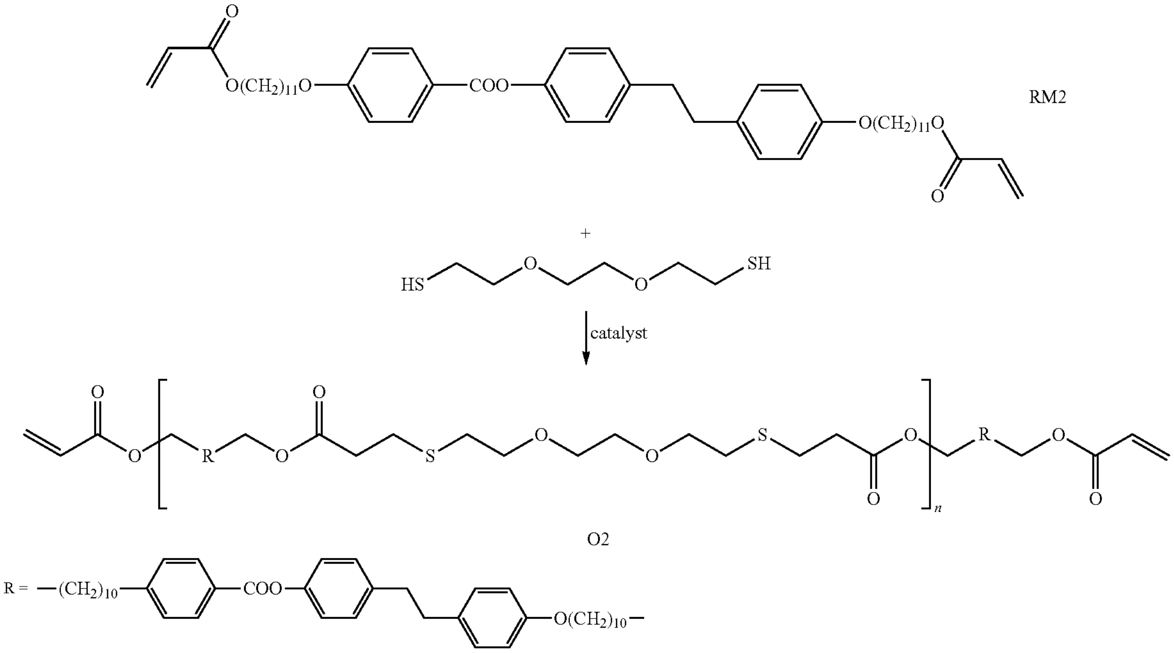

RM2

O2 wherein n is given by the average molecular weights shown in Table 2.

The smectic reactive mesogen RM2 (Cr 63 SB 99 SA 103 I) is stirred with 2,2'-(ethylenedioxy)diethanediol (DODT) in the presence of the catalyst 1,8-diazabicyclo[5.4.0]undec-7-ene (3 drops) in dichloromethane (20 mL) for 18 h at 38° C. The reaction mixture is washed sequentially with 0.1M HCl solution, distilled water, and brine. The organic phase is dried ($MgSO_4$), and the solvent removed under reduced pressure. The residue is dried under high vacuum at 40° C. for 1 day to yield the desired product at high yields (>95%). Four samples with different ratio RM2/DODT are prepared as shown in Table 2.

TABLE 2

| Name | Ratio RM2/DODT | RM2 [mmol] | DODT [mmol] | Mn [g/mol] | PDI | n |
|---|---|---|---|---|---|---|
| O2A | 2 | 2 | 1 | 1762 | 1.83 | ~1 |
| O2B | 1.5 | 3 | 2 | 2625 | 1.31 | ~2 |
| O2C | 1.2 | 1 | 0.83 | 5680 | 2.68 | ~5 |
| O2D | 1.12 | 1 | 0.89 | 8618 | 3.43 | ~8 |

Mn is estimated through 1H-NMR analysis and the PDI is determined by gel permeation chromatography (GPC), with tetrahydrofuran (THF) as eluent versus polystyrene standards.

The oligomers show the following LC phase sequences:

O2A: SmX 42 N 106 I

O2B: SmX 40 N 109 I polyimide alignment layer. After the solvent is evaporated off a continuous film of the coated mixture SRMM1 is formed (2.9 μm).

The coated film of SRMM1 is annealed at 100° C. and then cooled down to RT, thereby converting the mixture from the nematic phase to the smectic A phase. The smectic A alignment is stable and can be observed even after storing the coated film prior to polymerisation.

The coated film of the mixture SRMM1 is polymerised by UV exposure to a UV-LED lamp (365 nm, 10 $mW/cm^2$) for 1 h at 30° C. to form a polymer film with a thickness of 2.9 μm wherein the smectic A alignment is permanently fixed.

2% of the dichroic diazo dye G205 (Hayashibara Biochemical Laboratories INC, Kankoh-Shikiso Institute, Okayama, Japan) is added to the mixture SRMM1 and a polymer film with a thickness of 2.3 μm is prepared as described above. The polymer film has a dichroic ratio of 21.3, determined from absorption measurements in accordance with equation (1) above. The polymer film is thus suitable as dichroic ultra-thin polariser (UTP).

EXAMPLE 3

The oligomer 03 is prepared as follows:

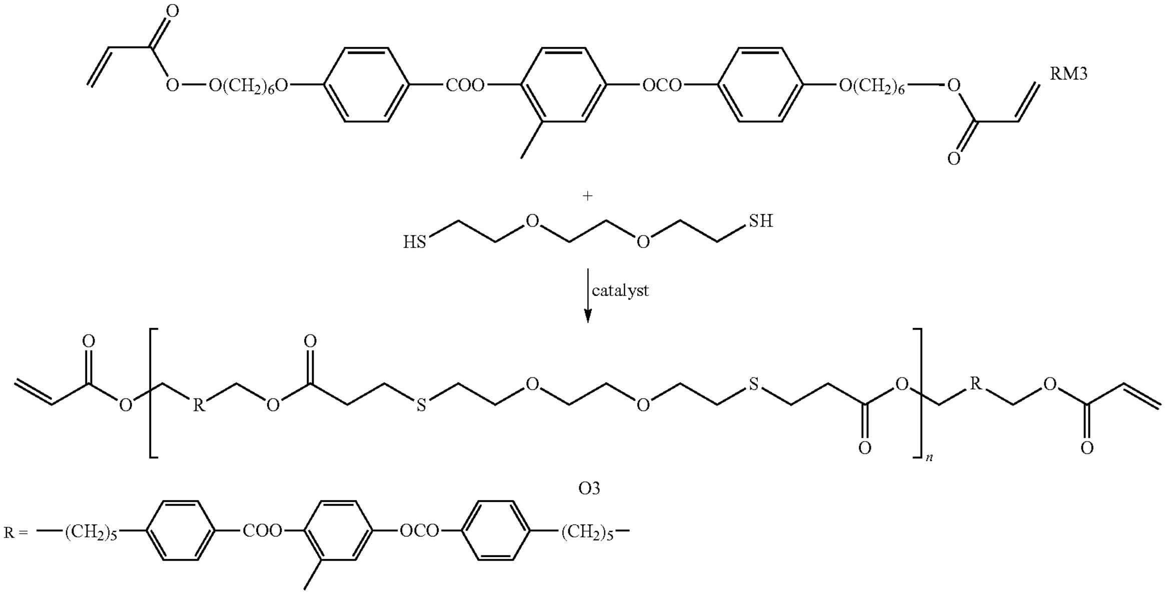

RM3

O3

O2C: SmX 16 N 108 I

O2D: SmX 18 N 110 I wherein the SmX phase is an unidentified smectic phase.

0.2 wt. % of the oligomer O2B are added to the mixture RMM1 to form polymerisable mixture SRMM2.

The mixture SRMM2 shows the following LC phase sequence: Cr 60 SmA 75 N 113 I (no obvious change compared to the pure mixture).

A solution of mixture SRMM1 in toluene (25 wt. % solid content) is spincoated onto a glass substrate comprising a wherein n is given by the average molecular weights shown in Table 3.

The nematic reactive mesogen RM3 (Cr 86 N 116 I) is stirred with 2,2'-(ethylenedioxy)diethanediol (DODT) in the presence of the catalyst 1,8-diazabicyclo[5.4.0]undec-7-ene (3 drops) in dichloromethane (20 mL) for 6 h at 38° C. The reaction mixture is washed sequentially with 0.1M HCl solution, distilled water, and brine. The organic phase is dried ($MgSO_4$), and the solvent removed under reduced pressure. The residue is dried under high vacuum at 40° C.

for 1 day to yield the desired product at high yields (>95%). Two samples with different ratio RM3/DODT are prepared as shown in Table 3.

TABLE 3

| Name | Ratio RM3/DODT | RM 2 [mmol] | DODT [mmol] | Mn [g/mol] | PDI | n |
|---|---|---|---|---|---|---|
| O3A | 2:1 | 3 | 1.5 | 1490 | 1.95 | ~1 |
| O3B | 3:2 | 2.25 | 1.5 | 2378 | 2.19 | ~2 |

Mn is estimated through $^1$H-NMR analysis and the PDI is determined by gel permeation chromatography (GPC), with tetrahydrofuran (THF) as eluent versus polystyrene standards.

The oligomers show the following LC phase sequences:

O3A: Cr 31.4 N 92.2 I

O3B: Cr 44.3 N 94.4 I 0.2 wt. % of the oligomer O3A are added to the mixture RMM1 to form polymerisable mixture SRMM3.

The mixture SRMM3 shows the following LC phase sequence: Cr 60 SmA 75 N 113 I (no obvious change compared to the pure mixture).

A solution of mixture SRMM3 in toluene (25 wt. % solid content) is spincoated onto a glass substrate as described in Example 1. After the solvent is evaporated off a continuous film of the coated mixture SRMM3 is formed (3.2 μm).

The coated film of SRMM3 is annealed at 100° C. and then cooled as described in Example 1, thereby converting the mixture to the smectic A phase. The smectic A alignment is stable and can be observed even after storing the coated film prior to polymerisation.

The coated film of SRMM3 is polymerised as described in Example 1 to form a polymer with a thickness of 3.2 μm wherein the smectic A alignment is permanently fixed.

2% of the dichroic diazo dye G205 (Hayashibara Biochemical Laboratories INC, Kankoh-Shikiso Institute, Okayama, Japan) are added to the mixture SRMM3 and a polymer film with a thickness of 2.8 μm is prepared as described in Example 1. The polymer film has a dichroic ratio of 17.4 and is suitable as ultra-thin dichroic polariser.

EXAMPLE 4

The polymerisable mixture RMM2 is formulated as follows:

| RMM 2 Compound | Conc. in % w/w |
|---|---|
| 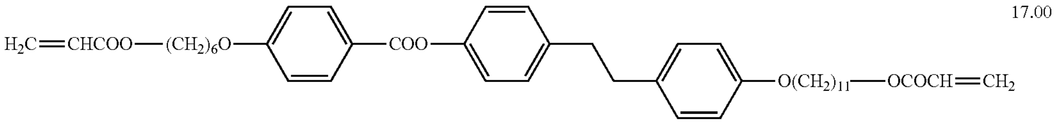 RM-D | 17.00 |
| 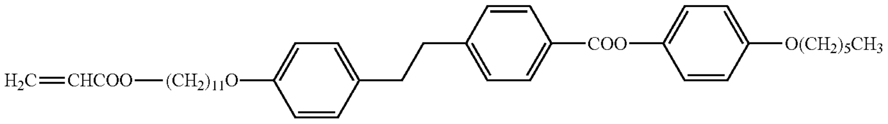 RM-E | 16.00 |
| 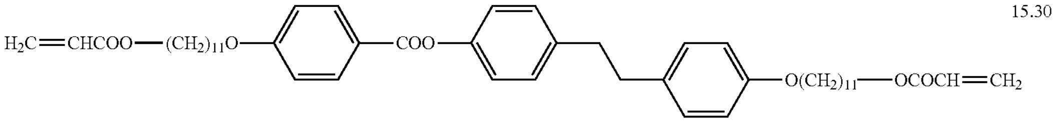 RM-F | 15.30 |
| 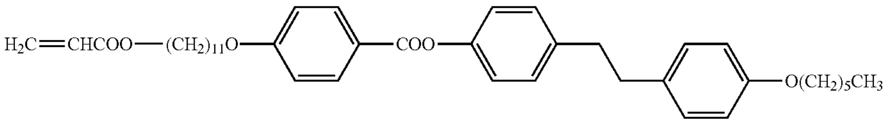 RM-G | 17.00 |
| 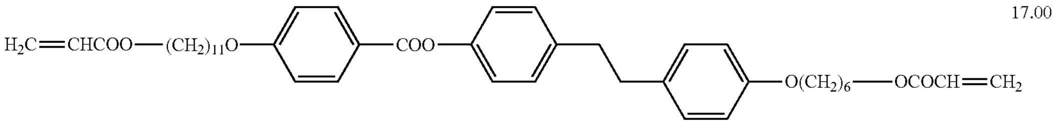 RM-H | 17.00 |
| 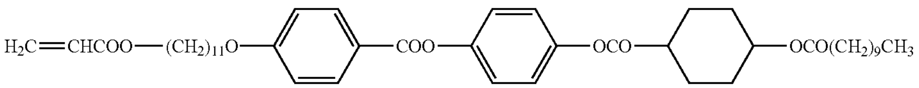 RM-I | 16.00 |
| SPI-03 (Photoinitiator) | 1.00 |
| BYK ®-361N (Surfactant) | 0.62 |
| Irganox ®1076 (Stabilizer) | 0.08 |

Irganox®1076 is a stabilizer, being commercially available (Ciba AG, Basel, Switzerland). SPI-03® is a photoinitiator, being commercially available (Samyang). BYK®-361N is a surfactant being commercially available (BYK, Germany).

The mixture RMM2 shows the LC phase sequence: SmX 91 SmA 107 I.

1 wt. % of the oligomer O2B are added to the mixture RMM2 to form polymerisable mixture SRMM4.

The mixture SRMM4 shows the following LC phase sequence: SmX 87 SmA 106 I.

A solution of mixture SRMM4 (1% of oligomer O1C in RMM2) in toluene (25 wt. % solid content) is spincoated onto a glass substrate as described in Example 3.1. After the solvent is evaporated off a continuous film of the coated mixture SRMM4 is formed (2.1 μm).

The coated film of SRMM4 is annealed and then cooled as described in Example 1, thereby converting the mixture to the smectic X phase. The smectic X alignment is stable and can be observed even after storing the coated film prior to polymerisation.

The coated film of SRMM4 is polymerised as described in Example 1 to form a polymer with a thickness of 2.1 μm wherein the smectic X alignment is permanently fixed.

2% of the dichroic diazo dye G205 are added to the mixture SRMM4 and a polymer film with a thickness of 1.8 μm is prepared as described in Example 1. The polymer film has a dichroic ratio of 20.9 and is suitable as ultra-thin dichroic polariser.

The invention claimed is:

1. A polymerisable liquid crystal medium comprising one or more mono-, di- or multireactive liquid crystal or mesogenic compounds and one or more polymerisable, oligomeric liquid crystal or mesogenic compounds, wherein the at least one polymerisable oligomeric liquid crystal or mesogenic compound comprises one or more compounds of formula O:

$$P^1\text{-}Sp^1\text{-}[MG^1\text{-}X^1\text{-}E\text{-}X^2]_n\text{-}MG^1\text{-}Sp^2\text{-}P^2 \qquad \text{O}$$

wherein $P^1$ and $P^2$ independently of each other denote a polymerisable group, $Sp^1$ and $Sp^2$ independently of each other are a spacer group or a single bond, $X^1$ and $X^2$ independently of each other denote —S—, —O— or $NR^x$, E is alkylene having 2 to 20 C atoms, which is optionally mono- or polysubstituted by F, Cl, Br, I or CN and in which, in addition, one or more non-adjacent $CH_2$ groups may each be replaced, independently of one another, by —O—, —S—, —NH—, —$NR^x$—, —$SiR^xR^y$—, —CO—, —COO—, —OCO—, —OCO—O—, —S—CO—, —CO—S—, —$NR^x$—CO—O—, —O—CO—$NR^x$—, —$NR^x$—CO—$NR^y$—, —CH═CH— or —C≡C— in such a way that O and/or S atoms are not linked directly to one another, $MG^1$ is a rod-shaped mesogenic group, which is selected of formula M $$\text{-}(A^1\text{-}Z^1)_a\text{-}A^2\text{-} \qquad \text{M}$$

wherein $A^1$ and $A^2$ denote, in case of multiple occurrence independently of one another, an aromatic or alicyclic group, which optionally contains one or more heteroatoms selected from N, O and S, and is optionally mono- or polysubstituted by L, L is P-Sp-, F, Cl, Br, I, —CN, —$NO_2$, —NCO, —NCS, —OCN, —SCN, —C(═O)$NR^xR^y$, —C(═O)$OR^x$, —C(═O)$R^x$, —$NR^xR^y$, —OH, —$SF_5$, optionally substituted silyl, aryl or heteroaryl with 1 to 12 C atoms, and straight chain alkyl, alkoxy, alkylcarbonyl, alkoxycarbonyl, alkylcarbonyloxy or alkoxycarbonyloxy with 1 to 12 C atoms or branched alkyl, alkoxy, alkylcarbonyl, alkoxycarbonyl, alkylcarbonyloxy or alkoxycarbonyloxy with 3 to 12 C atoms, wherein one or more H atoms are optionally replaced by F or Cl, $R^x$ and $R^y$ independently of each other denote H or alkyl with 1 to 12 C-atoms, $Z^1$ denotes, in case of multiple occurrence independently of one another, —O—, —S—, —CO—, —COO—, —OCO—, —S—CO—, —CO—S—, —O—COO—, —CO—$NR^x$—, —$NR^x$—CO—, —$NR^x$—CO—NRY, —$NR^x$—CO—O—, —O—CO—$NR^x$—, —$OCH_2$—, —$CH_2O$—, —$SCH_2$—, —$CH_2S$—, —$CF_2O$—, —$OCF_2$—, —$CF_2S$—, —$SCF_2$—, —$CH_2CH_2$—, —$(CH_2)_{n1}$, —$CF_2CH_2$—, —$CH_2CF_2$—, —$CF_2CF_2$—, —CH═N—, —N═CH—, —N═N—, —CH═$CR^x$—, —$CY_1$═$CY_2$—, —C≡C—, —CH═CH—COO—, —OCO—CH═CH— or a single bond, $Y^1$ and $Y^2$ independently of each other denote H, F, Cl or CN, a is 1, 2, 3 or 4, n1 is an integer from 1 to 10, n is the average number of repeat units per molecule of compound of formula O and is from 1 to 10.

2. The polymerisable LC medium according to claim 1, which exhibits a smectic B phase.

3. The polymerisable LC medium according to claim 2, which shows a sequence nematic phase—smectic A phase—smectic B phase with decreasing temperature.

4. The polymerisable LC medium according to claim 1, wherein the one or more compounds of formula O comprise one or more compounds of formula O1:

O1

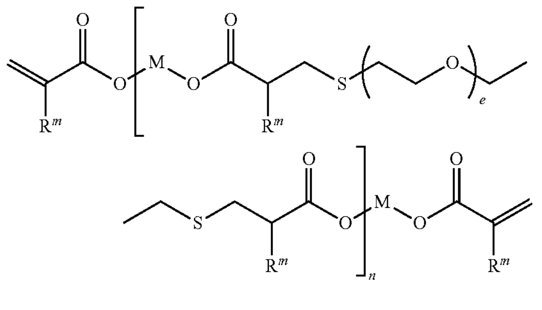

wherein n is the average number of repeat units per molecule of compound of formula O1 and is from 1 to 10, e is 1, 2, 3 or 4, $R^m$ is H or $CH_3$, and M is selected from the following formulae:

M-1

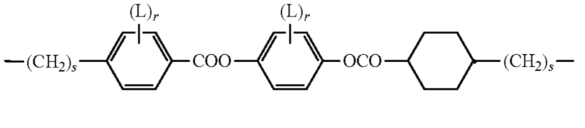

-continued

M-2

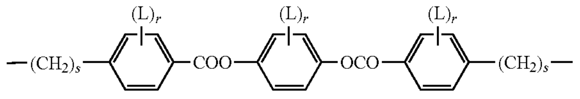

M-3

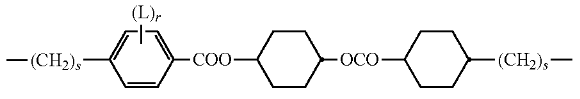

wherein L is P-Sp-, F, Cl, Br, I, —CN, —$NO_2$, —NCO, —NCS, —OCN, —SCN, —C(═O) $NR^xR^y$, —C(═O) OR*, —C(═O)$R^x$, —$NR^xR^y$, —OH, —$SF_5$, optionally substituted silyl, aryl or heteroaryl with 1 to 12 C atoms, and straight chain alkyl, alkoxy, alkylcarbonyl, alkoxycarbonyl, alkylcarbonyloxy or alkoxycarbonyloxy with 1 to 12 C atoms or branched alkyl, alkoxy, alkylcarbonyl, alkoxycarbonyl, alkylcarbonyloxy or alkoxycarbonyloxy with 3 to 12 C atoms, wherein one or more H atoms are optionally replaced by F or Cl, r is 0, 1, 2, 3, or 4, and s is an integer from 1 to 20.

5. The polymerisable LC medium according to claim 1, wherein the concentration of the polymerisable oligomeric liquid crystal or mesogenic compound is from 0.05 to 15%.

6. The polymerisable LC medium according to claim 1, which contains one or more di- or multireactive mesogenic compounds selected from formula DRM:

$P^1$-$Sp^1$-MG-$Sp^2$-$P^2$ DRM wherein

MG is a rod-shaped mesogenic group, which is selected of formula M

-($A^1$-$Z^1$)$_a$-$A^2$- M.

7. The polymerisable LC medium according to claim 1, wherein the concentration of di- or multireactive mesogenic compounds is from 5 to 70% by weight.

8. The polymerisable LC medium according to claim 6, comprising one or more monoreactive mesogenic compounds selected from formula MRM:

$P^1$-$Sp^1$-MG-R MRM wherein

R denotes P-Sp-, F, Cl, Br, I, —CN, —$NO_2$, —NCO, —NCS, —OCN, —SCN, —C(═O)$NR^xR^y$, —C(═O) X, —C(═O)$OR^x$, —C(═O) RY, —$NR^xR^y$, —OH, —$SF_5$, optionally substituted silyl, straight chain or branched alkyl, alkoxy, alkylcarbonyl, alkoxycarbonyl, alkylcarbonyloxy or alkoxycarbonyloxy with 1 to 12 1 to 6 C atoms, wherein one or more H atoms are optionally replaced by F or Cl, X is halogen, and $R^x$ and $R^y$ are independently of each other H or alkyl with 1 to 12 C-atoms.

9. The polymerisable LC medium according to claim 1, wherein the concentration of the monoreactive mesogenic compounds is from 1 to 80% by weight.

10. The polymerisable LC medium according to claim 1, further comprising one or more dyes or chromophores.

11. The polymerisable LC medium according to claim 10, wherein the concentration of the dye(s) is from 0.1 to 10% by weight.

12. A polymerisable oligomeric liquid crystal or mesogenic compound of formula O1:

O1

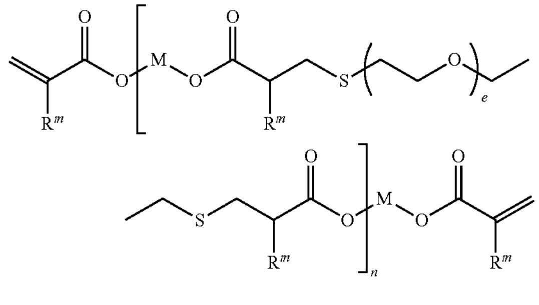

wherein n is the average number of repeat units per molecule of compound of O1 and is from 1 to 10, e is 1, 2, 3 or 4, $R^m$ is H or $CH_3$, and M is selected from the following formulae:

M-1

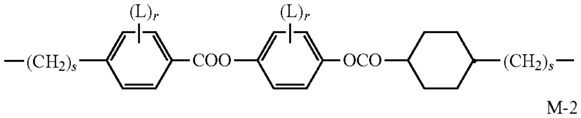

M-2

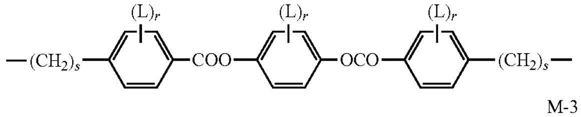

M-3

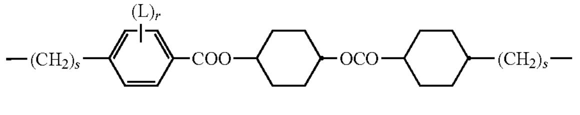

wherein L is P-Sp-, F, Cl, Br, I, —CN, —$NO_2$, —NCO, —NCS, —OCN, —SCN, —C(═O)$NR^xR^y$, —C(═O) $OR^x$, —C(═O)$R^x$, —$NR^xR^y$, —OH, —$SF_5$, optionally substituted silyl, aryl or heteroaryl with 1 to 12 C atoms, and straight chain alkyl, alkoxy, alkylcarbonyl, alkoxycarbonyl, alkylcarbonyloxy or alkoxycarbonyloxy with 1 to 12 C atoms or branched alkyl, alkoxy, alkylcarbonyl, alkoxycarbonyl, alkylcarbonyloxy or alkoxycarbonyloxy with 3 to 12 C atoms, wherein one or more H atoms are optionally replaced by F or Cl, r is 0, 1, 2, 3, or 4, and s is an integer from 1 to 20.

13. A process of preparing the polymerisable LC medium of claim 1, wherein $P^1$ and $P^2$ denote an acrylate or methacrylate group, and wherein the compound of formula O is formed by the step of reacting a compound of formula MD $H_2C$═CH—CO—O-$Sp^1$-$MG^1$-$Sp^2$-O—CO—CH═$CH_2$ MD wherein $R^m$ denotes H or $CH_3$, with a compound of formula DT $HX^1$-E-$X^2H$ DT in the presence of catalyst.

14. The process of claim 13, wherein the compound of formula MD is selected from subformula MD1

$$H_2C{=}CR'''{-}CO{-}O{-}M{-}O{-}CO{-}CR'''{=}CH_2 \qquad MD1$$

wherein M is selected from formulae M-1, M-2 and M-3

M-1

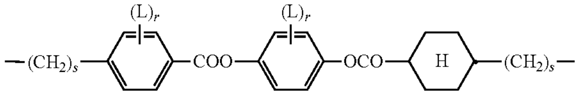

M-2

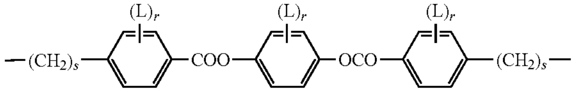

M-3

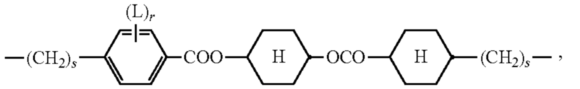

and $R'''$ is H or $CH_3$, wherein the compound of formula DT is selected from subformula DT1

$$HS{-}(CH_2CH_2O)_e{-}CH_2CH_2{-}SH \qquad DT1$$

wherein e is 1, 2, 3 or 4, and the compounds of formulae MD1 and DT1 are reacted in the presence of catalyst.

15. A method for the preparation of a polymer film, comprising forming a polymer film from a polymerisable LC medium according to claim 1 and polymerising the LC medium.

16. A process of preparing a polymer film comprising the steps of providing a layer of a polymerisable LC medium according to claim 1 onto a substrate, which is optionally provided with an alignment layer capable of inducing a planar alignment to the layer of the polymerisable LC medium, heating the polymerisable LC medium to a temperature where it exhibits a nematic phase, cooling the polymerisable LC medium, or allowing it to cool, to a temperature where it exhibits a smectic phase, preferably a smectic B phase, irradiating the layer of the polymerisable LC medium with actinic radiation.

17. A polymer film obtainable by the process according to claim 16.

18. An optical component in an optical or electrooptical device, comprising the polymer film of claim 17.

19. An optical component or an optical, electronic or electrooptical device, comprising a polymerisable LC medium according to claim 1.

20. The optical, electronic or electrooptical device according to claim 19, selected from electrooptical displays, non-linear optic (NLO) devices, optical information storage devices, electronic devices, electroluminescent displays, organic photovoltaic (OPV) devices, lighting devices, sensor devices, electro photographic recording devices, organic memory devices or devices for AR/AV/VR applications.

* * * * *